US008667945B2

(12) United States Patent
Sasaki

(10) Patent No.: US 8,667,945 B2
(45) Date of Patent: Mar. 11, 2014

(54) PISTON OF INTERNAL COMBUSTION ENGINE

(75) Inventor: Masato Sasaki, Sagamihara (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 205 days.

(21) Appl. No.: 13/167,157

(22) Filed: Jun. 23, 2011

(65) Prior Publication Data

US 2011/0315111 A1 Dec. 29, 2011

(30) Foreign Application Priority Data

Jun. 28, 2010 (JP) ................................ 2010-145981
Mar. 23, 2011 (JP) ................................ 2011-063502

(51) Int. Cl.
*F16J 1/04* (2006.01)
*F02F 3/00* (2006.01)
*B23P 11/00* (2006.01)

(52) U.S. Cl.
USPC ................ 123/193.6; 123/193.1; 29/888.048; 92/223

(58) Field of Classification Search
USPC .......... 123/193.1, 193.6; 92/223; 29/888.048; 508/100, 107
See application file for complete search history.

(56) References Cited

U.S. PATENT DOCUMENTS 5,314,717 A * 5/1994 Alt ................................ 427/282
5,857,440 A * 1/1999 O'Dowd et al. ........... 123/193.6
5,884,600 A * 3/1999 Wang et al. ................ 123/193.6
7,287,459 B2 * 10/2007 Tabata et al. ..................... 92/159
7,377,206 B2 * 5/2008 Douglas .......................... 92/223
7,981,497 B2 * 7/2011 Ichikawa ....................... 428/116
8,220,433 B2 * 7/2012 Sasaki ........................ 123/193.6
8,429,958 B2 * 4/2013 Saito et al. ................. 73/114.78
2004/0263855 A1 * 12/2004 Segall et al. .................. 356/446
2007/0225177 A1 * 9/2007 Murase et al. ................ 508/104
2008/0060603 A1 3/2008 Kuroda et al.
2008/0223211 A1 * 9/2008 Maier et al. ...................... 92/172
2008/0283021 A1 * 11/2008 Maier et al. ................ 123/197.3
2009/0165743 A1 * 7/2009 Kemnitz et al. ............ 123/193.6
2010/0142872 A1 * 6/2010 Egami et al. .................. 384/462
2010/0251886 A1 * 10/2010 Fussner et al. .................. 92/223
2010/0261625 A1 * 10/2010 Hakamata ..................... 508/103

FOREIGN PATENT DOCUMENTS

JP 61187608 A * 8/1986 ............. G01B 21/00
JP 2008-56750 A 3/2008

* cited by examiner

*Primary Examiner* — Lindsay Low
*Assistant Examiner* — Tea Holbrook
(74) *Attorney, Agent, or Firm* — Crowell & Moring LLP

(57) ABSTRACT

A piston for an internal combustion engine includes a piston base material including a pair of skirt portions opposed to each other in a radial direction of the piston base material. The piston includes a multiple-layer coating formed on at least one of surfaces of the pair of skirt portions. The piston further includes marks provided to respective layers of the multiple-layer coating at locations different from each other.

10 Claims, 20 Drawing Sheets

PISTON OF INTERNAL COMBUSTION ENGINE

BACKGROUND OF THE INVENTION

The present invention relates to a piston of internal combustion engine, on which a multiple-layer coating is formed.

U.S. Patent Application Publication No. 2008/0060603 corresponding to Japanese Patent Application Publication No. 2008-56750 (hereinafter referred to as, patent document 1) discloses a previously-proposed piston of internal combustion engine for an automobile, as one method of improving an abrasion resistance or a seizing resistance of the piston.

In this technique, a surface of piston base material is coated by a lower-layer coating composite, and a surface of the lower-layer coating composite is coated by an upper-layer coating composite. The lower-layer coating composite includes an epoxy resin and a polyamide-imide resin as binding resins, and a polytetrafluoroethylene and a molybdenum disulfide as solid lubricants. The upper-layer coating composite includes the epoxy resin and the polyamide-imide resin as the binding resins, a boron nitride as the solid lubricant, and a silicon nitride and an alumina as hard particles. That is, a double-layer coating composite is formed in order to attain a superior abrasion resistance and to improve the seizing resistance and an initial fitting property.

SUMMARY OF THE INVENTION

However, in the technique disclosed by the patent document 1, the upper and lower layers of the double-layer coating composite are simply in an overcoated state. Hence, it cannot be recognized whether or not the upper and lower layers of the double-layer coating composite have been properly formed, from an outward appearance of the piston. Therefore, there is a risk that a piston including only single layer of coating is distributed as a piston product by mistake, so that a reliability of piston product becomes low.

It is an object of the present invention to provide a piston of an internal combustion engine, devised to enable to determine whether or not a predetermined multiple-layer coating has been formed on an outer surface of the piston, from an outer appearance of the piston.

According to one aspect of the present invention, there is provided a piston for an internal combustion engine, comprising: a piston base material including a pair of skirt portions opposed to each other in a radial direction of the piston base material; a multiple-layer coating formed on at least one of surfaces of the pair of skirt portions; and marks provided to respective layers of the multiple-layer coating at locations different from each other.

According to another aspect of the present invention, there is provided a piston for an internal combustion engine, comprising: a piston base material including a pair of skirt portions opposed to each other in a radial direction of the piston base material; and a multiple-layer coating formed on at least one of surfaces of the pair of skirt portions, wherein an upper layer of the multiple-layer coating is formed with a window portion, and a surface of the piston base material or a lower layer of the multiple-layer coating is exposed through the window portion.

According to still another aspect of the present invention, there is provided a piston for an internal combustion engine, comprising: a piston base material including a pair of skirt portions opposed to each other in a radial direction of the piston base material; a multiple-layer coating formed on at least one of surfaces of the pair of skirt portions, the multiple-layer coating containing a solid lubricant; and single-layer mark coatings provided at locations which are different from each other and which are away from the multiple-layer coating through a non-coated portion between the multiple-layer coating and each of the single-layer mark coatings.

The other objects and features of this invention will become understood from the following description with reference to the accompanying drawings.

BRIEF DESCRIPTION OF THE DRAWINGS

FIG. 6A is an obliquely perspective view showing a state of the piston in which only a lower-layer coating composite has been formed. FIG. 6B is an obliquely perspective view showing a state of the piston in which only an upper-layer coating composite has been formed. FIG. 6C is an obliquely perspective view showing a state of the piston in which the upper-layer coating composite has been formed on the lower-layer coating composite.

FIG. 7A is an obliquely perspective view showing a state of the piston in which only a lower-layer coating composite has been formed. FIG. 7B is an obliquely perspective view showing a state of the piston in which only an upper-layer coating composite has been formed. FIG. 7C is an obliquely perspective view showing a state of the piston in which the upper-layer coating composite has been formed on the lower-layer coating composite.

FIG. 8A is an obliquely perspective view showing a state of the piston in which only a lower-layer coating composite has been formed. FIG. 8B is an obliquely perspective view showing a state of the piston in which only an upper-layer coating composite has been formed. FIG. 8C is an obliquely perspective view showing a state of the piston in which the upper-layer coating composite has been formed on the lower-layer coating composite.

FIG. 9A is an obliquely perspective view showing a state of the piston in which only a lower-layer coating composite has been formed. FIG. 9B is an obliquely perspective view showing a state of the piston in which only an upper-layer coating composite has been formed. FIG. 9C is an obliquely perspective view showing a state of the piston in which the upper-layer coating composite has been formed on the lower-layer coating composite.

FIG. 10A is an obliquely perspective view showing a state of the piston in which only a lower-layer coating composite has been formed. FIG. 10B is an obliquely perspective view showing a state of the piston in which only an upper-layer coating composite has been formed. FIG. 10C is an obliquely perspective view showing a state of the piston in which the upper-layer coating composite has been formed on the lower-layer coating composite.

FIG. 11A is an obliquely perspective view showing a state of the piston in which only a lower-layer coating composite has been formed. FIG. 11B is an obliquely perspective view showing a state of the piston in which only an upper-layer coating composite has been formed. FIG. 11C is an obliquely perspective view showing a state of the piston in which the upper-layer coating composite has been formed on the lower-layer coating composite.

FIG. 12A is an obliquely perspective view showing a state of the piston in which only a lower-layer coating composite has been formed. FIG. 12B is an obliquely perspective view showing a state of the piston in which only an upper-layer coating composite has been formed. FIG. 12C is an obliquely perspective view showing a state of the piston in which the upper-layer coating composite has been formed on the lower-layer coating composite.

FIG. 13A is an obliquely perspective view showing a state of the piston in which only a lower-layer coating composite has been formed. FIG. 13B is an obliquely perspective view showing a state of the piston in which only an upper-layer coating composite has been formed. FIG. 13C is an obliquely perspective view showing a state of the piston in which the upper-layer coating composite has been formed on the lower-layer coating composite.

FIG. 14A is an obliquely perspective view showing a state of the piston in which only a lower-layer coating composite has been formed. FIG. 14B is an obliquely perspective view showing a state of the piston in which only an upper-layer coating composite has been formed. FIG. 14C is an obliquely perspective view showing a state of the piston in which the upper-layer coating composite has been formed on the lower-layer coating composite.

FIG. 15A is an obliquely perspective view showing a state of the piston in which only a lower-layer coating composite has been formed. FIG. 15B is an obliquely perspective view showing a state of the piston in which only an upper-layer coating composite has been formed. FIG. 15C is an obliquely perspective view showing a state of the piston in which the upper-layer coating composite has been formed on the lower-layer coating composite.

FIG. 16A is an obliquely perspective view showing a state of the piston in which only a lower-layer coating composite has been formed. FIG. 16B is an obliquely perspective view showing a state of the piston in which only an upper-layer coating composite has been formed. FIG. 16C is an obliquely perspective view showing a state of the piston in which the upper-layer coating composite has been formed on the lower-layer coating composite.

FIG. 17A shows a pattern when first-layer to sixth-layer coatings each having a plurality of window portions have been formed in this order. FIG. 17B shows a case that a treatment of the fourth-layer coating has been forgotten. FIG. 17C shows a case that all of the first-layer to sixth-layer coatings have been formed.

FIG. 18A shows a pattern when first-layer to fourth-layer coatings each formed with a single mark have been applied in this order. FIG. 18B shows a case that a treatment of the third-layer coating has been forgotten. FIG. 18C shows a case that all of the first-layer to fourth-layer coatings have been formed.

FIG. 19A shows a pattern when first-layer to nth-layer coatings each formed with a single mark have been applied in this order. FIG. 19B shows a case that a treatment of the third-layer coating has been forgotten. FIG. 19C shows a case that all of the first-layer to nth-layer coatings have been formed.

FIG. 20A is an obliquely perspective view showing a state of the piston in which only a lower-layer coating composite has been formed. FIG. 20B is an obliquely perspective view showing a state of the piston in which only an upper-layer coating composite has been formed. FIG. 20C is an obliquely perspective view showing a state of the piston in which the upper-layer coating composite has been formed on the lower-layer coating composite.

DETAILED DESCRIPTION OF THE INVENTION

Figure 1:
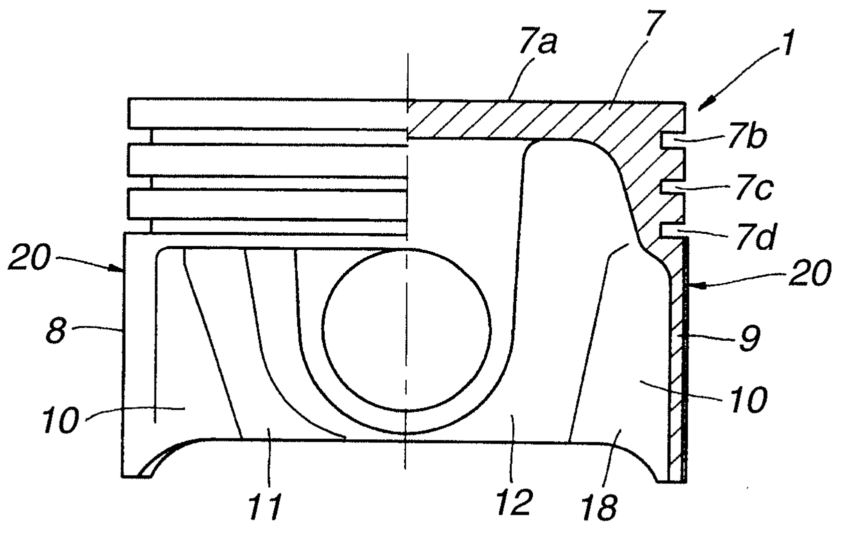
FIG. 1 is a partly-sectional front view of a piston in a first embodiment according to the present invention.

Hereinafter, embodiments of a piston of internal combustion engine according to the present invention will be explained in detail referring to the drawings. In the following embodiments, the piston is applied to a four-cycle gasoline engine.

First Embodiment

Figure 2:
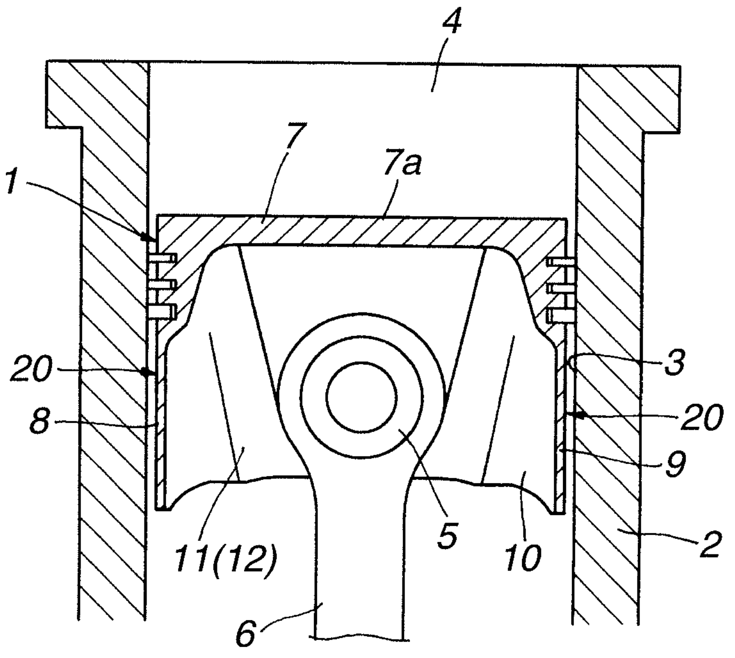
FIG. 2 is a longitudinal sectional view of a main part that shows a state where the piston of the first embodiment has been applied to an internal combustion engine.

As shown in FIG. 2, a cylinder block 2 includes a cylinder wall-surface 3 formed substantially in a circularly cylindrical shape. The piston 1 is provided to be able to slide in contact with the cylinder wall-surface 3. The piston 1 cooperates with the cylinder wall-surface 3 and a cylinder head (not shown) to define a combustion chamber 4. The piston 1 is connected to a crankshaft (not shown) through a con-rod 6. The con-rod 6 is connected with a piston pin 5.

Whole of the piston 1 is integrally molded by an Al—Si-series aluminum alloy in AC8A (JIS: Japanese Industrial Standards). As shown in FIGS. 1, 2 and 6A-6C, the piston 1 is formed approximately in a circularly cylindrical shape. The piston 1 includes a crown portion 7, a pair of thrust-side skirt portion 8 and counter-thrust-side skirt portion 9, and a pair of apron portions 11 and 12. The crown portion 7 includes a crown surface 7*a* on which the combustion chamber 4 is defined. The pair of thrust-side skirt portion 8 and counter-thrust-side skirt portion 9 are provided integrally on an outer circumferential edge of a lower end of the crown portion 7. Each of the pair of thrust-side skirt portion 8 and counter-thrust-side skirt portion 9 is formed in a circular-arc shape in cross section. The pair of apron portions 11 and 12 are connected to circumferential both ends of the pair of skirt portions 8 and 9 through linking portions 10.

The crown portion 7 is formed to be relatively thick and formed in a disc shape. Valve recesses 7*e* and 7*f* are formed in the crown surface 7*a* of the crown portion 7. Each of the valve recesses 7*e* and 7*f* functions to prevent an interference with an intake or exhaust valve. Three ring grooves 7*b*, 7*c* and 7*d* are formed in an outer circumferential portion of the crown portion 7. The three ring grooves 7*b*, 7*c* and 7*d* hold three piston rings such as a pressure ring and an oil ring.

The both skirt portions 8 and 9 are located symmetrically with respect to an axis (a center line parallel to a piston moving direction) of the piston 1, and are shaped like arc in cross section. In other words, the both skirt portions 8 and 9 are formed to be opposed to each other in a radial direction of the piston 1. Almost whole of the both skirt portions 8 and 9 is formed to be relatively thin. When the piston 1 moves toward its bottom dead center at the time of expansion stroke and the like, the thrust-side skirt portion 8 is inclined to the cylinder wall-surface 3 to become in press-contact with the cylinder wall-surface 3 in relation to an angle of the con-rod 6. On the other hand, when the piston 1 rises at the time of compression stroke and the like, the counter-thrust-side skirt portion 9 is inclined to the cylinder wall-surface 3 to become in press-contact with the cylinder wall-surface 3 in a counter direction. A load of this press contact of the thrust-side skirt portion 8 against the cylinder wall-surface 3 is larger than that of the counter-thrust-side skirt portion 9 against the cylinder wall-surface 3 because the thrust-side skirt portion 8 presses the cylinder wall-surface 3 by receiving a combustion pressure.

Figures 4A, 4B, 4C:
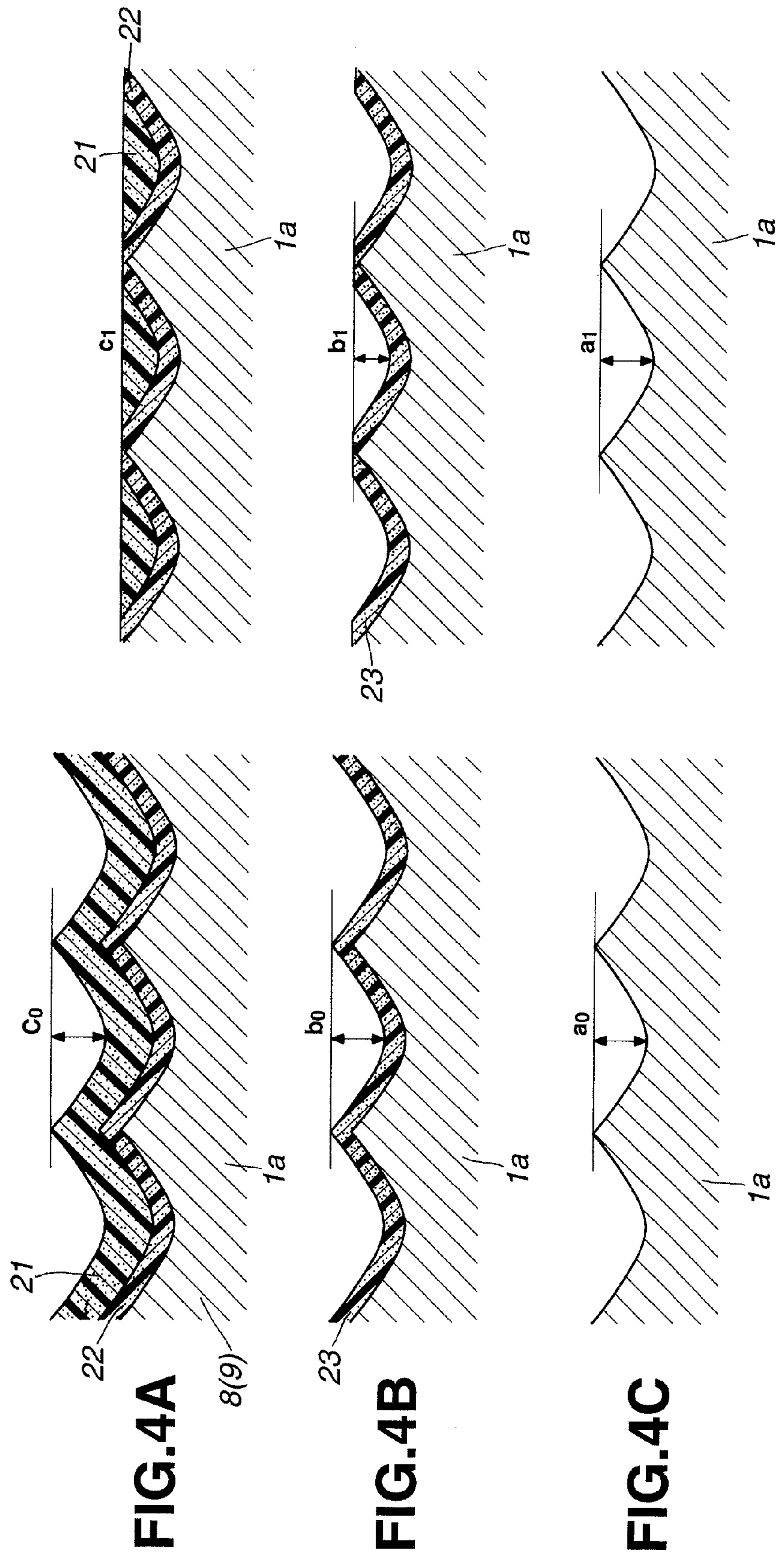
FIG. 4A is an enlarged cross-sectional view schematically showing states before and after the multiple-layer coating composite is abraded by sliding in the first embodiment.
FIG. 4B is an enlarged cross-sectional view schematically showing states before and after a coating composite having no upper-layer coating is abraded by the sliding in the first embodiment.
FIG. 4C is an enlarged cross-sectional schematically showing states before and after a piston base material covered by no coating is abraded by the sliding in the first embodiment.

As shown in FIGS. 1 and 4A, a multiple-layer coating composite 20 has been applied to the thrust-side skirt portion 8 and the counter-thrust-side skirt portion 9 of the piston 1. In this embodiment, the multiple-layer coating composite 20 has two (upper and lower) layers.

That is, the multiple-layer coating composite 20 includes an upper-layer coating composite 21 and a lower-layer coating composite 22. The multiple-layer coating composite 20 is formed by using one or two selected from an epoxy resin, a polyimide resin and a polyamide-imide resin (PAI) which are superior in heat resistance, abrasion resistance (wear resistance) and adhesion property, as binding resins.

Specifically, the upper-layer coating composite 21 is set to include any one of the epoxy resin, the polyimide resin and the polyamide-imide resin (which are the binding resins) in a range from 5 to 50 wt %. Moreover, the upper-layer coating composite 21 is set to include a molybdenum disulfide ($MoS_2$) in a range from 50 to 95 wt %, as a solid lubricant.

If the binding resin(s) accounts for a rate lower than 5 wt %, an adhesion between the upper-layer coating composite 21 and the lower-layer coating composite 22 is reduced due to a reduction of binding force. On the contrary, if the binding resin(s) accounts for a rate higher than 50 wt %, the solid lubricant is relatively decreased so that an initial fitting property (initial compatibility) is reduced.

The lower-layer coating composite 22 is set to include any one of the epoxy resin, the polyimide resin and the polyamide-imide resin (which are the binding resins) same as the upper-layer coating composite 21, in a range higher than or equal to 50 wt %. Moreover, the lower-layer coating composite 22 is set to basically include one or more of a polytetrafluoroethylene (PTFE), the molybdenum disulfide ($MoS_2$) and a graphite (GF), in a range lower than or equal to 50 wt % as the solid lubricant. The lower-layer coating composite 22 does not necessarily need to include the solid lubricant.

Figure 5:
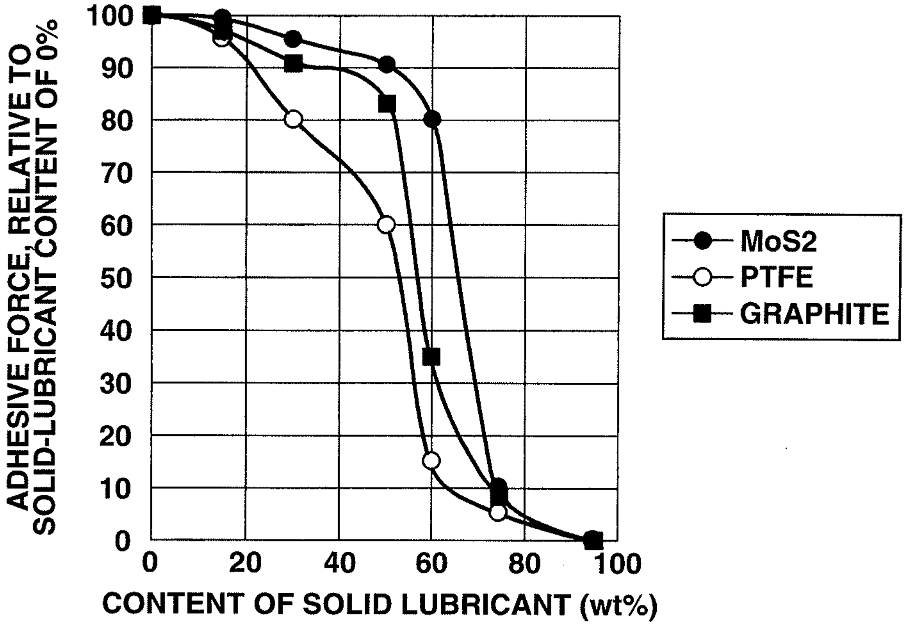
FIG. 5 is a characteristic view showing a relation between the content of solid lubricant and an adhesive force.

If the binding resin(s) accounts for a rate lower than 50 wt % in the lower-layer coating composite 22, an adhesion between the lower-layer coating composite 22 and a piston base material (base member) 1*a* is reduced. In a case that each of the solid lubricants is increasingly added to the binding resin PAI as shown in FIG. 5, an adhesive force is rapidly reduced when the solid lubricant exceeds 50 wt %, i.e., when the binding resin becomes lower than 50 wt %.

That is, the lower-layer coating composite 22 functions to secure the adhesion between the lower-layer coating composite 22 and the piston base material 1*a*, and to secure the adhesion between the upper-layer coating composite 21 and the lower-layer coating composite 22.

Accordingly, although the lower-layer coating composite 22 does not need to contain the solid lubricant, the solid lubricant(s) may be added to the lower-layer coating composite 22 within a rate capable of securing these adhesions, in order to improve a characteristic of the coating. If the polytetrafluoroethylene is lower than 15 wt % in the lower-layer coating composite 22, a lubricity is reduced. On the other hand, if the polytetrafluoroethylene is higher than 30 wt %, an abrasion amount is increased.

Moreover, if the molybdenum disulfide as the solid lubricant accounts for a rate lower than 5 wt % in the lower-layer coating composite 22, a seizing resistance is reduced. On the other hand, if the molybdenum disulfide accounts for a rate higher than 20 wt % in the lower-layer coating composite 22, the abrasion amount is increased due to a reduction of strength of the coating.

Moreover, an improvement of the seizing resistance can be achieved by a synergistic effect of combination between the molybdenum disulfide and the graphite given as the solid lubricants.

That is, the lower-layer coating composite 22 can be formed by using the molybdenum disulfide and the graphite in addition to the polytetrafluoroethylene as the solid lubricants. In this case, it is preferable that a total rate of the molybdenum disulfide and the graphite ranges from 5 to 20 wt %, and a rate of the molybdenum disulfide ranges from 1 to 10 wt %.

This is because the above-mentioned improvement effect of seizing resistance by the synergistic effect cannot be obtained if the molybdenum disulfide is lower than 1 wt %, and the abrasion resistance is reduced if the molybdenum disulfide is higher than 10 wt %.

Figure 3A:
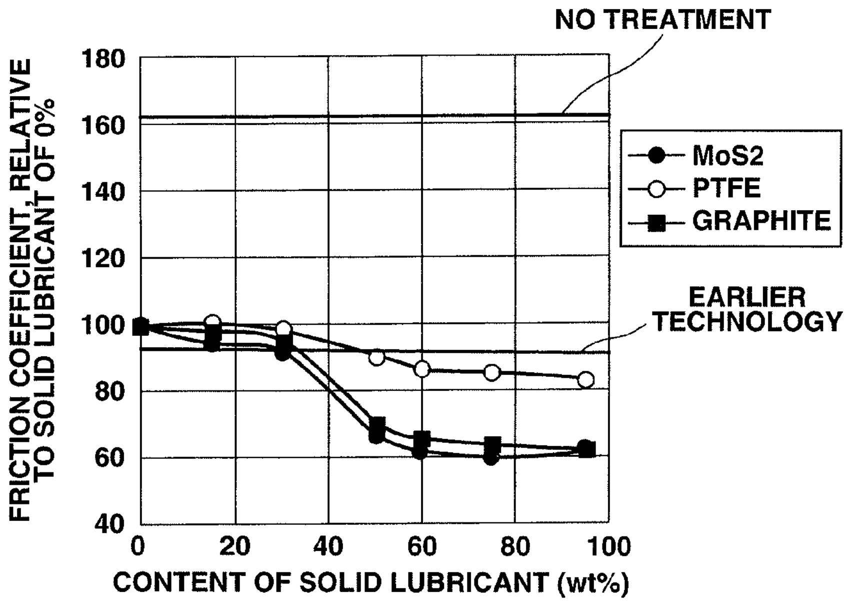
FIG. 3A is a graph showing a relation between a content of solid lubricant and a friction coefficient.

Moreover, a reason to set a content (contained amount) of the molybdenum disulfide and the like functioning as the solid lubricants of the upper-layer coating composite 21 in the range from 50 to 95 wt % is as follows. That is, from an experimental result as shown in FIG. 3A, the initial fitting property is reduced if the content of the solid lubricant(s) is lower than 50 wt %. On the other hand, if the content of the solid lubricant(s) is higher than 95 wt %, a content of the binding resin becomes lower than 5 wt %, so that the adhesion between the upper-layer coating composite 21 and the lower-layer coating composite 22 is reduced due to the reduction of binding force as mentioned above.

A method of adjusting the upper-layer coating composite 21 and the lower-layer coating composite 22 which constitute the multiple-layer coating composite 20 is as follows, for example. An organic solvent is mixed with the epoxy resin, the polyimide resin and the polyamide-imide resin which are the biding resins. Then, the solid lubricant(s) is added to this resin solution. Further, as needed basis, hard particles are added to this resin solution. Then, this solution is mixed and dispersed by use of a beads-mill or the like.

A total mixture amount of the hard particles, the binding resin and the solid lubricant(s) such as PTFE, $MoS_2$ and GF is equal to 100 wt % of the upper-layer coating composite 21 or the lower-layer coating composite 22.

The upper-layer coating composite 21 and the lower-layer coating composite 22 which constitute the multiple-layer coating composite 20 according to the present invention are diluted by organic solvent, as needed basis. Then, the upper-layer coating composite 21 and the lower-layer coating composite 22 are applied to the piston base material 1*a*, as a coating material.

That is, the lower-layer coating composite 22 and the upper-layer coating composite 21 are applied to an outer circumferential surface of (the thrust-side skirt portion 8 and the counter-thrust-side skirt portion 9 of) the piston base material 1*a*, in this order. Then, the applied lower-layer coating composite 22 and upper-layer coating composite 21 are burned and cured to obtain the multiple-layer coating composite 20.

The organic solvent which is used for the above-mentioned dilution has only to be able to dissolve the binding resin. That is, the organic solvent which is used in this embodiment is not limited to specified solvents.

A burning condition such as a burning temperature and a burning time is appropriately set. The lower-layer coating composite 22 and the upper-layer coating composite 21 can be properly burned even at a temperature lower than 200° C., and therefore, is applicable also to an aluminum-alloy base material of the piston 1.

A film thickness (coating thickness) of the multiple-layer coating composite 20 can be appropriately selected. However, it is preferable that the film thickness of the multiple-layer coating composite 20 falls within a range from 5 to 40 μm, in consideration of an applying workability of the coating composite 20 and a cost for the coating composite 20 and the like.

A concrete method for applying the multiple-layer coating composite 20 on the surface of the piston base material 1*a* will now be explained.

First Surface-Treatment Method

At first, oil and dirt of the surface of the piston base material 1*a* are removed by a pretreatment such as a solvent degreasing and an alkaline degreasing.

Next, the lower-layer coating composite 22 is applied to (putted on) the surface of the piston base material 1*a* by a known method such as an air spray and a screen printing. Subsequently, the upper-layer coating composite 21 is applied to (putted on) an upper surface of the lower-layer coating composite 22.

Subsequently, the organic solvent is removed by drying. Then, the applied upper-layer coating composite 21 and lower-layer coating composite 22 are burned under a known condition, for example, for thirty minutes at 180° C. or for twenty minutes at 200° C. Thereby, the multiple-layer coating composite 20 constituted by the upper-layer coating composite 21 and the lower-layer coating composite 22 is formed.

Second Surface-Treatment Method

Another surface-treatment method is as follows. At first, oil and dirt are removed from the surface of the piston base material 1*a* on which the multiple-layer coating composite 20 should be formed, by a pretreatment such as the solvent degreasing and the alkaline degreasing.

Then, the lower-layer coating composite 22 is applied to the surface of the piston base material 1*a* by a known method such as the air spray and the screen printing. Then, the applied lower-layer coating composite 22 is burned under a known condition, for example, for thirty minutes at 180° C. or for twenty minutes at 200° C.

Subsequently, the piston base material 1*a* is drawn (pulled) out from a burning furnace. Then, the upper-layer coating composite 21 is applied to an upper surface of the lower-layer coating composite 22 of the piston base material 1*a* under a condition where the piston base material 1*a* has a temperature ranging from 50 to 120° C. Subsequently, the piston base material 1*a* is dried without burning, so that the multiple-layer coating composite 20 constituted by the upper-layer coating composite 21 and the lower-layer coating composite 22 is formed.

The multiple-layer coating composite according to the present invention is widely applicable to various sliding members for various intended uses under an environment of oil lubrication and an environment of dry lubrication. The epoxy resin, the polyimide resin and the polyamide-imide resin which are the biding resins for the multiple-layer coating composite are superior in adhesion property. Hence, these epoxy resin, polyimide resin and polyamide-imide resin are applicable to various materials (each constituting the base material) such as cast iron, steel and copper alloy in addition to various kinds of aluminum alloy materials, without being limited to specified kinds of base materials. In particular, it is favorable that the epoxy resin, the polyimide resin and the polyamide-imide resin are used for the piston 1 of internal combustion engine, especially, for the thrust-side skirt portion 8 and the counter-thrust-side skirt portion 9 of the piston 1 as in this embodiment.

Experimental Example

The following formulas are satisfied as to the piston 1 having a notch shape (track recess) in an outer circumferential surface of the piston 1.

$$t2 \geq a-5\ (\mu m)$$

$$t1 \geq 2\ (\mu m)$$

Wherein a denotes a height (depth) of the notch, t1 denotes a film thickness of the lower-layer coating composite 22, and t2 denotes a film thickness of the upper-layer coating composite 21. As the binding resins, the polyamide-imide resin (PAI) was used. The content (contained amount) of each of the graphite (GF), the molybdenum disulfide ($MoS_2$) and the polytetrafluoroethylene (PTFE) given as the solid lubricants was varied from 0 wt % to 95 wt %.

The upper-layer coating composite and the lower-layer coating composite were adjusted as shown in the following table 1.

TABLE 1

(two-page spread)

| | UPPER-LAYER COATING COMPOSITE, wt % | | | | LOWER-LAYER COATING COMPOSITE, wt % | | | | CHARACTERISTIC | | | |
|---|---|---|---|---|---|---|---|---|---|---|---|---|
| | PAI | MoS2 | GF | PTFE | PAI | MoS2 | GF | PTFE | F.C. *1 | NOTCH HEIGHT, µm *2 | ADHESIVE FORCE *3 | REMARKS |
| 1 | 100 | 0 | 0 | 0 | 67 | 0 | 33 | 0 | 100 | 7.8 | — | COMPARATIVE COATING |
| 2 | 85 | 15 | 0 | 0 | 67 | 0 | 33 | 0 | 95 | 7.4 | — | COMPARATIVE COATING |
| 3 | 70 | 30 | 0 | 0 | 67 | 0 | 33 | 0 | 92 | 7 | — | COMPARATIVE COATING |
| 4 | 50 | 50 | 0 | 0 | 67 | 0 | 33 | 0 | 80 | 5.3 | — | PRESENT INVENTION |
| 5 | 40 | 60 | 0 | 0 | 67 | 0 | 33 | 0 | 62 | 4.5 | — | PRESENT INVENTION |
| 6 | 25 | 75 | 0 | 0 | 67 | 0 | 33 | 0 | 60 | 3 | — | PRESENT INVENTION |
| 7 | 5 | 95 | 0 | 0 | 67 | 0 | 33 | 0 | 61 | 0 | — | PRESENT INVENTION |
| 8 | 85 | 0 | 15 | 0 | 67 | 0 | 33 | 0 | 98 | 7.5 | — | COMPARATIVE COATING |
| 9 | 70 | 0 | 30 | 0 | 67 | 0 | 33 | 0 | 95 | 7 | — | COMPARATIVE COATING |
| 10 | 50 | 0 | 50 | 0 | 67 | 0 | 33 | 0 | 85 | 5.5 | — | PRESENT INVENTION |
| 11 | 40 | 0 | 60 | 0 | 67 | 0 | 33 | 0 | 66 | 5.3 | — | PRESENT INVENTION |
| 12 | 25 | 0 | 75 | 0 | 67 | 0 | 33 | 0 | 64 | 4.8 | — | PRESENT INVENTION |
| 13 | 5 | 0 | 95 | 0 | 67 | 0 | 33 | 0 | 63 | 2 | — | PRESENT INVENTION |
| 14 | 85 | 0 | 0 | 15 | 67 | 0 | 33 | 0 | 100 | 7.8 | — | COMPARATIVE COATING |
| 15 | 70 | 0 | 0 | 30 | 67 | 0 | 33 | 0 | 98 | 7.4 | — | COMPARATIVE COATING |
| 16 | 50 | 0 | 0 | 50 | 67 | 0 | 33 | 0 | 90 | 6.7 | — | COMPARATIVE COATING |
| 17 | 40 | 0 | 0 | 60 | 67 | 0 | 33 | 0 | 86 | 6.6 | — | COMPARATIVE COATING |
| 18 | 25 | 0 | 0 | 75 | 67 | 0 | 33 | 0 | 85 | 6.5 | — | COMPARATIVE COATING |
| 19 | 5 | 0 | 0 | 95 | 67 | 0 | 33 | 0 | 83 | 6.7 | — | COMPARATIVE COATING |
| 20 | 0 | 0 | 0 | 0 | 67 | 0 | 33 | 0 | 94 | 6.9 | — | EARLIER TECHNOLOGY |
| 21 | 0 | 0 | 0 | 0 | 0 | 0 | 0 | 0 | 162 | 9 | — | NO TREATMENT |
| 22 | 0 | 0 | 0 | 0 | 100 | 0 | 0 | 0 | — | — | 100 | COMPARATIVE COATING |
| 23 | 0 | 0 | 0 | 0 | 85 | 15 | 0 | 0 | — | — | 99 | COMPARATIVE COATING |
| 24 | 0 | 0 | 0 | 0 | 70 | 30 | 0 | 0 | — | — | 95 | COMPARATIVE COATING |
| 25 | 0 | 0 | 0 | 0 | 50 | 50 | 0 | 0 | — | — | 90 | COMPARATIVE COATING |
| 26 | 0 | 0 | 0 | 0 | 40 | 60 | 0 | 0 | — | — | 80 | COMPARATIVE COATING |
| 27 | 0 | 0 | 0 | 0 | 25 | 75 | 0 | 0 | — | — | 10 | COMPARATIVE COATING |
| 28 | 0 | 0 | 0 | 0 | 5 | 95 | 0 | 0 | — | — | 0 | COMPARATIVE COATING |
| 29 | 0 | 0 | 0 | 0 | 85 | 0 | 15 | 0 | — | — | 97 | COMPARATIVE COATING |

TABLE 1-continued (two-page spread)

| | UPPER-LAYER COATING COMPOSITE, wt % | | | | LOWER-LAYER COATING COMPOSITE, wt % | | | | CHARACTERISTIC | | | |
|---|---|---|---|---|---|---|---|---|---|---|---|---|
| | PAI | MoS2 | GF | PTFE | PAI | MoS2 | GF | PTFE | F.C. *1 | NOTCH HEIGHT, µm *2 | ADHESIVE FORCE *3 | REMARKS |
| 30 | 0 | 0 | 0 | 0 | 70 | 0 | 30 | 0 | — | — | 91 | COMPARATIVE COATING |
| 31 | 0 | 0 | 0 | 0 | 50 | 0 | 50 | 0 | — | — | 83 | COMPARATIVE COATING |
| 32 | 0 | 0 | 0 | 0 | 40 | 0 | 60 | 0 | — | — | 35 | COMPARATIVE COATING |
| 33 | 0 | 0 | 0 | 0 | 25 | 0 | 75 | 0 | — | — | 8 | COMPARATIVE COATING |
| 34 | 0 | 0 | 0 | 0 | 5 | 0 | 95 | 0 | — | — | 0 | COMPARATIVE COATING |
| 35 | 0 | 0 | 0 | 0 | 85 | 0 | 0 | 15 | — | — | 95 | COMPARATIVE COATING |
| 36 | 0 | 0 | 0 | 0 | 70 | 0 | 0 | 30 | — | — | 80 | COMPARATIVE COATING |
| 37 | 0 | 0 | 0 | 0 | 50 | 0 | 0 | 50 | — | — | 60 | COMPARATIVE COATING |
| 38 | 0 | 0 | 0 | 0 | 40 | 0 | 0 | 60 | — | — | 15 | COMPARATIVE COATING |
| 39 | 0 | 0 | 0 | 0 | 25 | 0 | 0 | 75 | — | — | 5 | COMPARATIVE COATING |
| 40 | 0 | 0 | 0 | 0 | 5 | 0 | 0 | 95 | — | — | 0 | COMPARATIVE COATING |
| 41 | 5 | 95 | 0 | 0 | 100 | 0 | 0 | 0 | — | — | 100 | PRESENT INVENTION |
| 42 | 5 | 95 | 0 | 0 | 85 | 15 | 0 | 0 | — | — | 98 | PRESENT INVENTION |
| 43 | 5 | 95 | 0 | 0 | 70 | 30 | 0 | 0 | — | — | 93 | PRESENT INVENTION |
| 44 | 5 | 95 | 0 | 0 | 50 | 50 | 0 | 0 | — | — | 91 | PRESENT INVENTION |
| 45 | 5 | 95 | 0 | 0 | 40 | 60 | 0 | 0 | — | — | 82 | COMPARATIVE COATING |
| 46 | 5 | 95 | 0 | 0 | 25 | 75 | 0 | 0 | — | — | 12 | COMPARATIVE COATING |
| 47 | 5 | 95 | 0 | 0 | 5 | 95 | 0 | 0 | — | — | 0 | COMPARATIVE COATING |
| 48 | 5 | 95 | 0 | 0 | 85 | 0 | 15 | 0 | — | — | 95 | PRESENT INVENTION |
| 49 | 5 | 95 | 0 | 0 | 70 | 0 | 30 | 0 | — | — | 93 | PRESENT INVENTION |
| 50 | 5 | 95 | 0 | 0 | 50 | 0 | 50 | 0 | — | — | 85 | PRESENT INVENTION |
| 51 | 5 | 95 | 0 | 0 | 40 | 0 | 60 | 0 | — | — | 33 | COMPARATIVE COATING |
| 52 | 5 | 95 | 0 | 0 | 25 | 0 | 75 | 0 | — | — | 10 | COMPARATIVE COATING |
| 53 | 5 | 95 | 0 | 0 | 5 | 0 | 95 | 0 | — | — | 0 | COMPARATIVE COATING |
| 54 | 5 | 95 | 0 | 0 | 85 | 0 | 0 | 15 | — | — | 93 | COMPARATIVE COATING |
| 55 | 5 | 95 | 0 | 0 | 70 | 0 | 0 | 30 | — | — | 78 | COMPARATIVE COATING |
| 56 | 5 | 95 | 0 | 0 | 50 | 0 | 0 | 50 | — | — | 63 | COMPARATIVE COATING |
| 57 | 5 | 95 | 0 | 0 | 40 | 0 | 0 | 60 | — | — | 17 | COMPARATIVE COATING |
| 58 | 5 | 95 | 0 | 0 | 25 | 0 | 0 | 75 | — | — | 3 | COMPARATIVE COATING |
| 59 | 5 | 95 | 0 | 0 | 5 | 0 | 0 | 95 | — | — | 0 | COMPARATIVE COATING |

*1 Friction coefficient (F.C.) when defining a value of friction coefficient of sample No. 1 as 100.

*2 After-testing notch height of sample which had a before-testing notch height equal to 10 µm.

*3 Adhesive force when defining a value of adhesive force between a base material made of aluminium alloy in AC8A-T6 and a coating made of PAI of 100 wt %, as 100.

The organic solvent was added to and mixed with the upper-layer and lower-layer coating composites for so each of the samples No. 1 to No. 59 except the sample No. 21. Then, each of the mixed upper-layer and lower-layer coating composites of the samples No. 1 to No. 59 was dispersed by the beads-mill for thirty minutes, so that upper-layer coating paint and lower-layer coating paint for each of the samples No. 1 to No. 59 were obtained.

The lower-layer coating paint for each sample was applied on a test piece 1*a* having a surface shape shown in FIGS.

4A-4C which was made of aluminum alloy in AC8A, so as to cause the entire lower-layer coating to have a film thickness ranging from 3 to 6 μm. Then, the lower-layer coating paint applied on the test piece 1*a* was burned for 30 minutes at 190° C.

Subsequently, the upper-layer coating paint for each sample was applied on (the lower-layer coating of) the test piece 1*a* so as to cause the entire upper-layer coating to have a film thickness ranging from 5 to 11 μm. Then, the upper-layer coating paint applied on the test piece 1*a* was dried by air drying without the burning.

Alternatively, the lower-layer coating paint applied on the test piece 1*a* may be dried by forced drying. In this case, the upper-layer coating paint applied on (the lower-layer coating of) the test piece 1*a* is burned for 30 minutes at 190° C.

As to the obtained samples No. 1 to 20 which had undergone the double-layer surface treatment and as to the sample No. 21 which had undergone no surface treatment, friction coefficients were measured by a chip-on-ring-type friction and abrasion tester under a lubricating environment where a slip speed is equal to 2 m/sec (meters per second), a contact material 1*a* FC250 (JIS), a slip distance is equal to 600 m, a surface pressure is equal to 1.3 MPa, and a drip amount of engine oil is equal to 5 mg/min (milligrams per minute).

Figure 3B:
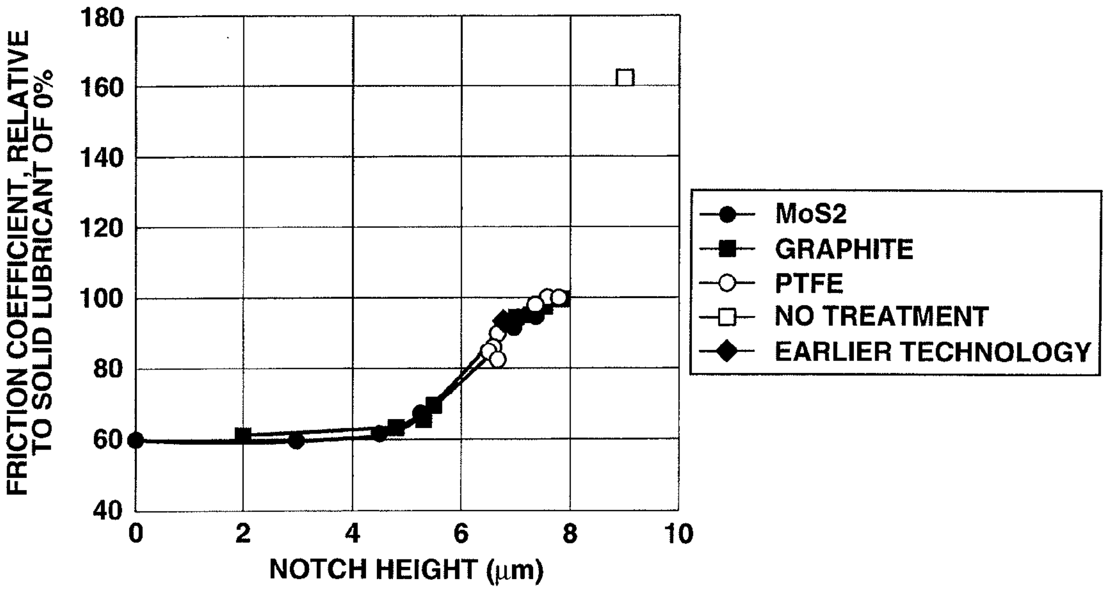
FIG. 3B is a characteristic view showing a relation between the friction coefficient and a notch height.

FIG. 3B is a graph showing that result, i.e., a relation between the friction coefficient and the notch height. As is clear from FIG. 3B, the friction coefficient is determined uniquely by the notch height. The friction coefficient becomes a lowest constant value when the notch height is lower than or equal to 5 μm.

That is, in order to obtain a low friction coefficient, it is effective to quickly abrade (wear) the upper-layer coating. Therefore, as is clear from FIG. 3A, the upper-layer coating composite 21 is easy to abrade when the upper-layer coating composite 21 contains the solid lubricant at a rate higher than or equal to 50 wt %. In particular, this is most effective in the case that the upper-layer coating composite 21 contains the molybdenum disulfide ($MoS_2$) as the solid lubricant. On the other hand, this becomes less effective in the case that the upper-layer coating composite 21 contains the graphite (GF) as the solid lubricant, and in the case that the upper-layer coating composite 21 contains the polytetrafluoroethylene (PTFE) as the solid lubricant.

FIG. 4A shows the first embodiment according to the present invention. In the case shown by FIG. 4A, the upper-layer coating composite 21 was formed to have a composition easy to abrade. In this case, the notch height is changed from C0 of original state to c1, by the sliding. On the other hand, FIG. 4C shows a case where the surface treatment has not been done. In this case, the notch height was changed from a0 of original state to a1, by the sliding. Since it is apparent that the aluminum alloy is more difficult to abrade than the coating constituted by the solid lubricant(s) and the binding resin, a relation of a1>c1 is satisfied.

Accordingly, the low friction can be obtained in this embodiment. FIG. 4B shows an earlier technology. In this case, the notch height was changed from b0 of original state to b1, by the sliding. The single coating of this earlier technology is easier to abrade than the aluminum alloy and more difficult to abrade than the upper-layer coating of FIG. 4A. Hence, a relation of a1>b1>c1 is satisfied. Therefore, in this embodiment according to the present invention, a lower friction than the case of earlier technology is attained.

For example, in the case of FIG. 4C, the notch height was abraded by 1 μm and hence changed from a0=10 μm to a1=9 μm by the sliding. In this case, the friction coefficient was extremely large to have a rate of 162% (see sample No. 21), with respect to a friction-coefficient value in the case of upper-layer coating that contains the solid lubricant of 0 wt % (see sample No. 1). Contrary to this, in the case of upper-layer coating that contains the $MoS_2$ of 75 wt %, the notch height was abraded by 7 μm by the sliding and hence changed from c0=10 μm to c1=3 μm. In this case, the friction coefficient was extremely small to have a rate of 60% (see sample No. 6), with respect to the friction-coefficient value in the case of upper-layer coating that contains the solid lubricant of 0 wt % (see sample No. 1).

Moreover, as understood by FIG. 4B, in the case that the biding resin exceeds 50 wt % of the upper-layer coating as disclosed by the Patent Document 1, i.e., in the case that the solid lubricant is lower than 50 wt % of the upper-layer coating; the abrasion is not promoted. Therefore, in such cases (see samples No. 2, No. 3, No. 8, No. 9 and No. 20), the friction coefficient can be lower than in the case of no surface treatment, but is higher than in this embodiment according to the present invention.

If the lower-layer coating is set to contain the solid lubricant(s) accounting for 50 wt % or more of the lower-layer coating (see examples No. 22 to No. 40), the adhesion property between the lower-layer coating and the piston base material 1*a* is reduced as shown in FIG. 5. Hence, the lower-layer coating that contains the solid lubricant(s) accounting for 50 wt % or more is inappropriate in terms of practical utility.

Therefore, the lower-layer coating in this embodiment according to the present invention is set to ensure the adhesion to the piston base material 1*a* and also to ensure the adhesion to the upper-layer coating containing the solid lubrication of 50 wt % or more.

As the solid lubricant for the lower-layer coating containing the binding resin of PAI, each content of the molybdenum disulfide ($MoS_2$), the graphite (GF) and the polytetrafluoroethylene (PTFE) was varied from 15 wt % through 30 wt %, 50 wt %, 60 wt % and 75 wt % to 95 wt % under a condition that the upper-layer coating was constituted by the binding resin of 5 wt % and the molybdenum disulfide of 95 wt % which does not secure the adhesion to the aluminum-alloy base material. The adhesive forces of these various samples (see samples No. 41 to No. 59) were measured. As a result, it is found that the adhesive force can be ensured by causing the lower-layer coating to contain the solid lubricant at a rate lower than or equal to 50 wt %, even if the upper-layer coating so composite which does not ensure the adhesion property is used.

As explained above, the adhesion property of the lower-layer coating composite 22 to the piston base material 1*a* superior in this embodiment. Moreover, is since the content (contained amount) of the molybdenum disulfide ($MoS_2$) is set at the range from 50 wt % to 95 wt % as the solid lubricant of the upper-layer coating composite 21, the initial fitting property (initial compatibility) is superior when the outer circumferential surfaces of the thrust-side skirt portion 8 and the counter-thrust-side skirt portion 9 of the piston 1 slide on the cylinder wall-surface 3. That is, a surface of the upper-layer coating composite 21 is abraded in a short time to quickly form a smooth sliding surface of the upper-layer coating composite 21, so that a superior initial fitting property can be obtained instantly.

In this embodiment, the single lower-layer coating composite 22 and the single upper-layer coating composite 21 are applied to both the skirt portions 8 and 9 of piston 1 in a double-layered state, as explained above. The piston 1 in this embodiment according to the present invention includes a means for checking (judging) whether or not these lower-layer coating composite 22 and upper-layer coating composite 21 have been applied without mistake. Both of the lower-layer coating composite 22 and the upper-layer coating composite 21 have a color close to black.

Figure 6A:
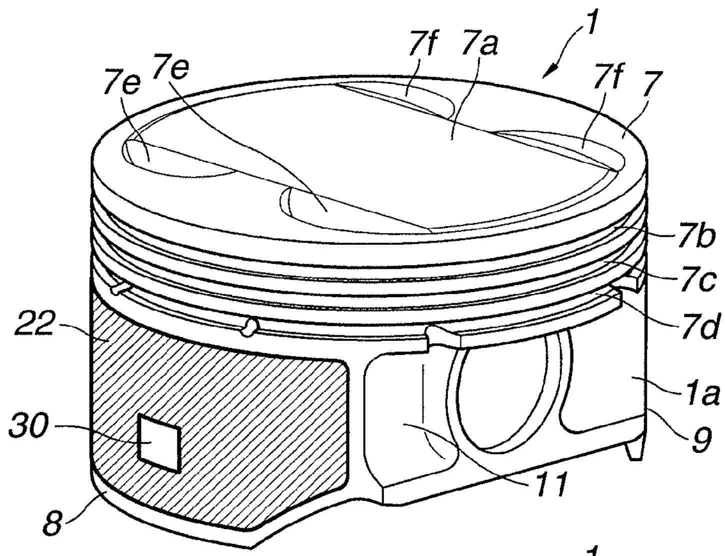
FIGS. 6A to 6C show a formation state of the multiple-layer coating composite applied to the piston in the first embodiment.

In more specifically, as shown in FIG. 6A, the lower-layer coating composite 22 is formed with a first window portion (not-coated portion) 30 located on each of the skirt portions 8 and 9. That is, the first window portion 30 is provided substantially at a circumferentially center location of each of the thrust-side skirt portion 8 and the counter-thrust-side skirt portion 9 and at a lower location (counter-crown-side portion) of each of the thrust-side skirt portion 8 and the counter-thrust-side skirt portion 9, when the lower-layer coating composite 22 is applied to the thrust-side skirt portion 8 and the counter-thrust-side skirt portion 9. This first window portion 30 is formed substantially in a relatively-small square shape, and is provided only to the lower-layer coating composite 22. It is noted that the first window portion 30 corresponds to a mark according to the present invention.

Figure 6B:
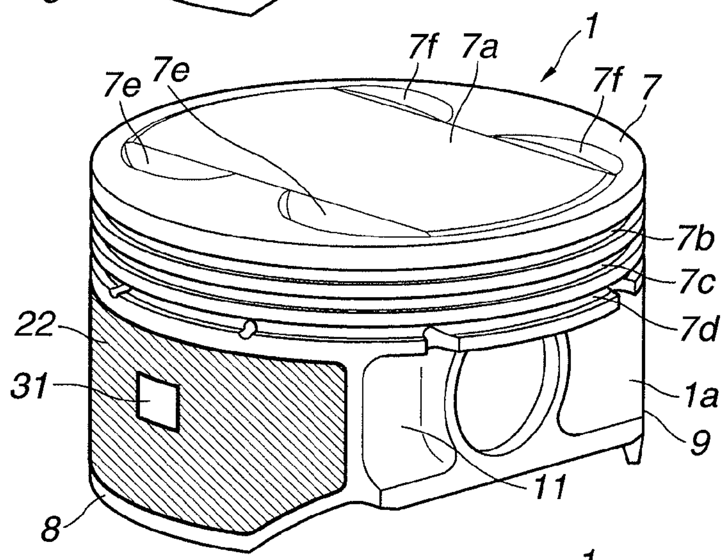

On the other hand, as shown in FIG. 6B, the upper-layer coating composite 21 is formed with a second window portion (not-coated portion) 31 located on each of the skirt portions 8 and 9. That is, the second window portion 31 is provided substantially at a circumferentially center location of each of the thrust-side skirt portion 8 and the counter-thrust-side skirt portion 9 and at a upper location (crown-side portion) of each of the thrust-side skirt portion 8 and the counter-thrust-side skirt portion 9, when the upper-layer coating composite 21 is applied to (the lower-layer coating composite 22 of) the thrust-side skirt portion 8 and the counter-thrust-side skirt portion 9. This second window portion 31 is formed substantially in a relatively small square shape in the same manner as the first window portion 30, and is provided only to the upper-layer coating composite 21. A forming location of the second window portion 31 is shifted from a forming location of the first window portion 30. That is, the second window portion 31 does not overlap with the first window portion 30 in the radial direction of the piston 1 (i.e., when viewed from a radially outer side of the piston 1). It is noted that is the second window portion 31 corresponds to the mark according to the present invention.

Accordingly, for example, if the upper-layer coating composite 21 has not been applied by mistake after the lower-layer coating composite 22 was applied to the piston base material 1*a*, the surface of the piston base material 1*a* is exposed through the first window portion 30 as shown by FIG. 6A. In this case, since the piston base material 1*a* is the aluminum alloy, the surface of the piston base material 1*a* has a color near silver. Hence, a working person can recognize and determine that only the lower-layer coating composite 22 has been applied, by visual perception.

For example, if the lower-layer coating composite 22 has not been applied by mistake although the upper-layer coating composite 21 has been applied to the piston base material 1*a*, the surface of the piston base material 1*a* is exposed through the second window portion 31 as shown by FIG. 6B. Hence, a working person can recognize and determine that only the upper-layer coating composite 21 has been applied, from the second window portion 31 by visual check.

Figure 6C:
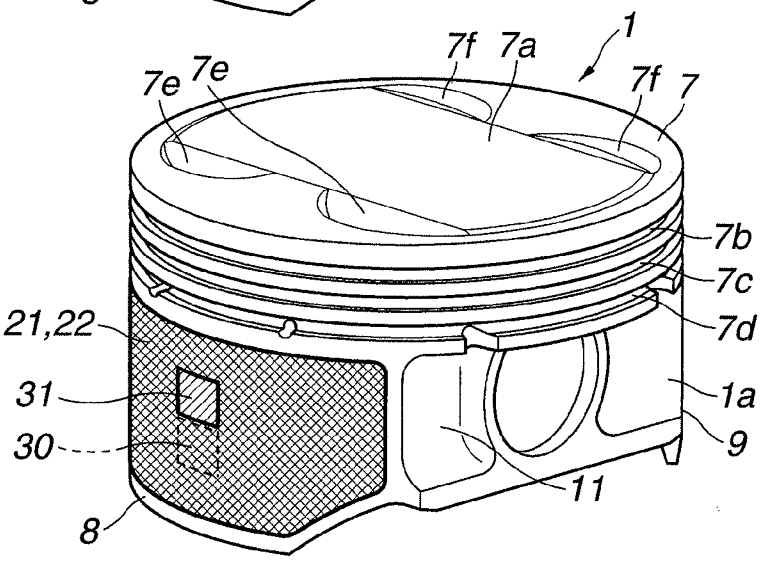

Moreover, if both of the lower-layer coating composite 22 and upper-layer coating composite 21 have been properly applied; the first window portion 30 is coated by the upper-layer coating composite 21, and the lower-layer coating composite 22 is exposed through the second window portion 31 as a background of the second window portion 31, as shown in FIG. 6C. That is, these first and second window portions 30 and 31 are closed or filled by the coating composites 21 and 22, and become almost black as a whole. Hence, a working person can recognize and determine that both of the lower-layer coating composite 22 and the upper-layer coating composite 21 have been formed.

Therefore, a piston including only single layer of coating can be prevented from being distributed as a piston product by error. Hence, a reliability of product can be enhanced.

The first and second window portions 30 and 31 are provided in a region of each skirt portion 8 or 9 which has a relatively less-frequent or weak slide contact with the cylinder wall-surface 3. Hence, the first and second window portions 30 and 31 are little influenced by friction so that a generation of abrasion can be suppressed. Moreover, a freedom degree of design of each skirt portion 8 or 9 in an axial direction of the piston 1 becomes high.

Moreover, the lower-layer coating composite 22 and the upper-layer coating composite 21 have filled the first and second window portions 30 and 31 in the case that both of the upper-layer coating composite 21 and the lower-layer coating composite 22 have been properly applied. Hence, the generation of abrasion and the like can be suppressed even if a slight influence of friction is caused at the first and second window portions 30 and 31.

Moreover, the first and second window portions 30 and 31 are formed together when the lower-layer coating composite 22 and the upper-layer coating composite 21 are applied and formed. Hence, a forming operation of the first and second window portions 30 and 31 is very easy without requiring any special equipment. Therefore, a rise in cost can also be suppressed.

Although the error recognition and determination using the first and second window portions 30 and 31 are done by the visual check of working person in the above explanation, the structure according to this embodiment is not limited to this. For example, the error recognition and determination using the first and second window portions 30 and 31 can be mechanically done by means of a camera or the like. Therefore, the first and second window portions 30 and 31 according to this embodiment are applicable also to an operation of automated production line.

Second Embodiment

Figure 7A:
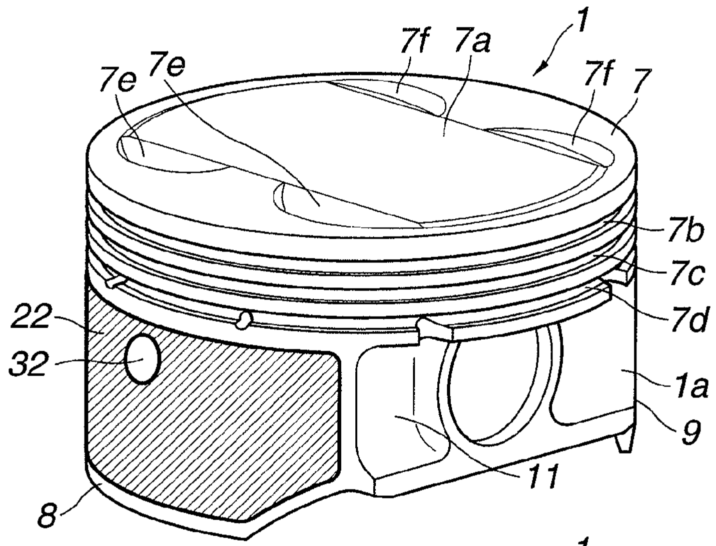
FIGS. 7A to 7C show a formation state of the multiple-layer coating composite applied to the piston in a second embodiment according to the present invention.
Figure 7B:
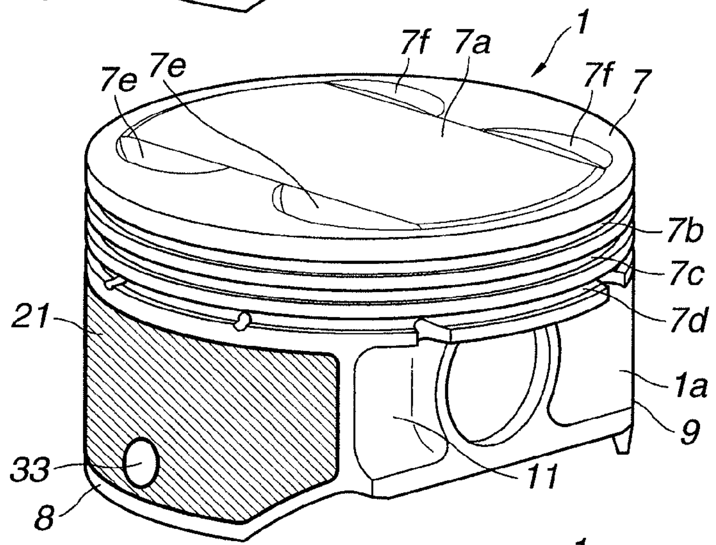
Figure 7C:
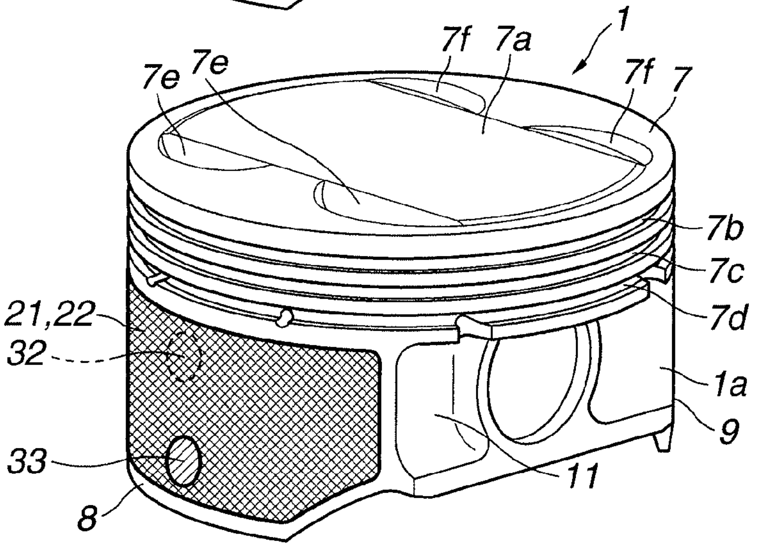

FIGS. 7A to 7C are views showing a second embodiment according to the present invention. Also in the second embodiment, the two of upper-layer and lower-layer coating composites 21 and 22 are applied on the piston base material 1*a* as the multiple-layer coating. As shown in FIGS. 7A and 7B, a first window portion (not-coated portion) 32 is provided to the lower-layer coating composite 22 as a mark of the lower-layer coating composite 22, and a second window portion (not-coated portion) 33 is provided to the upper-layer coating composite 21 as a mark of the upper-layer coating composite 21. That is, the lower-layer coating composite 22 is formed with the mark of the first window portion 32, and the upper-layer coating composite 21 is formed with the mark of the second window portion 33. Each of the first window portion 32 and the second window portion 33 is formed in a circular shape. In the same manner as the first embodiment, a forming location of the first window portion 32 is shifted from a forming location of the second window portion 33 in the up-down direction (i.e., in the axial direction of piston 1). Thereby, the first window portion 32 does not overlap with the second window portion 33 in the radial direction of the piston 1 (i.e., when viewed from a radially outer side of the piston 1).

Accordingly, if only one of the upper-layer coating composite 21 and the lower-layer coating composite 22 has been applied to the piston base material 1*a*, only one of the first window portion 32 and the second window portion 33 has been formed. In this case, the surface of the piston base material 1*a* is exposed through the first window portion 32 or the second window portion 33 as shown in FIGS. 7A and 7B. Since the piston base material 1*a* is the aluminum alloy, the surface of the piston base material 1*a* has a color near silver. Hence, a working person can recognize and determine that only one of the upper-layer coating composite 21 and the lower-layer coating composite 22 has been applied, by visual perception.

Therefore, a piston including only single layer of coating can be prevented from being distributed as a piston product by mistake. Hence, the reliability of product can be enhanced.

Moreover, if both of the lower-layer coating composite 22 and upper-layer coating composite 21 have been applied; the first window portion 32 is coated by the upper-layer coating composite 21, and the lower-layer coating composite 22 is exposed through the second window portion 33, as shown in FIG. 7C. That is, these first and second window portions 32 and 33 are closed or filled by the coating composites 21 and 22, and become almost black as a whole. Hence, a working person can recognize and determine that both of the lower-layer coating composite 22 and the upper-layer coating composite 21 have been applied, by vision.

The other operations and effects in the second embodiment are similar as those in the first embodiment.

Third Embodiment

Figure 8A:
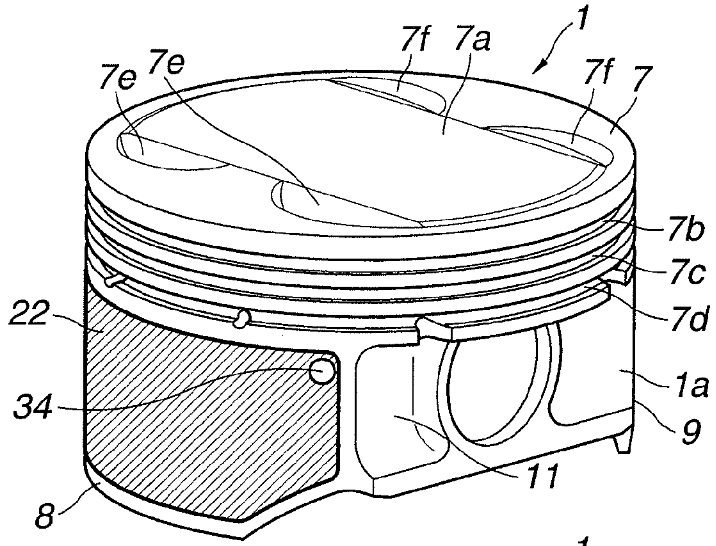
FIGS. 8A to 8C show a formation state of the multiple-layer coating composite applied to the piston in a third embodiment according to the present invention.
Figure 8B:
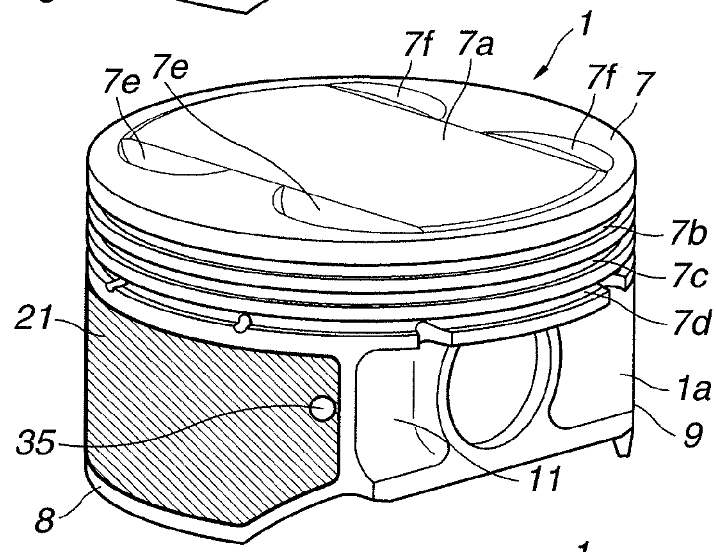
Figure 8C:
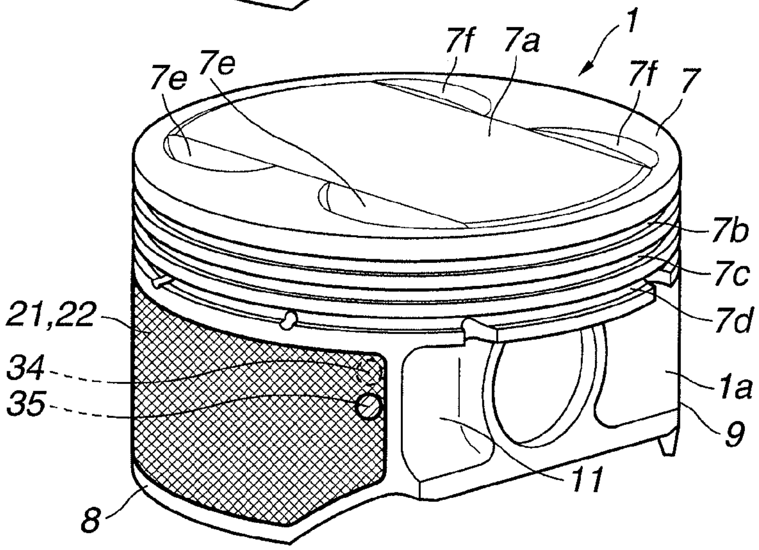

FIGS. 8A to 8C are views showing a third embodiment according to the present invention. Also in the third embodiment, the two of upper-layer and lower-layer coating composites 21 and 22 are applied on the piston base material 1*a*. As shown in FIG. 8A, a first window portion 34 is provided to the lower-layer coating composite 22 as a mark of the lower-layer coating composite 22. The first window portion 34 is located at circumferentially one end part of each of the skirt portions 8 and 9 and is located at an upper end part (crown-side end part) of each of the skirt portions 8 and 9. The first window portion 34 is formed in a small circle shape. Moreover, as shown in FIG. 8B, a second window portion 35 is provided to the upper-layer coating composite 21 as a mark of the upper-layer coating composite 21. The second window portion 35 is located at circumferentially one end part of each of the skirt portions 8 and 9 and is located approximately at an is axially center part of each of the skirt portions 8 and 9. The second window portion 35 is formed in a small circle shape. A forming location of the first window portion 34 is different from a forming location of the second window portion 35 in the up-down direction (i.e., in the axial direction of piston 1). Thereby, the first window portion 34 does not overlap with the second window portion 35 in the radial direction of the piston 1 (i.e., when viewed from a radially outer side of the piston 1).

Accordingly, if only one of the upper-layer coating composite 21 and the lower-layer coating composite 22 has been applied to the piston base material 1*a*, only one of the first window portion 34 and the second window portion 35 has been formed. In this case, the surface of the piston base material 1*a* exposed through the first window portion 34 or the second window portion 35 as shown in FIGS. 8A and 8B. Since the piston base material 1*a* the aluminum alloy, the surface of the piston base material 1*a* has a color close to silver. Hence, a working person can recognize and determine that only one of the upper-layer coating composite 21 and the lower-layer coating composite 22 has been applied, by vision.

As a result, a piston including only single layer of coating can be prevented from being distributed as a piston product by mistake. Hence, the reliability of product can be improved.

Moreover, if both of the lower-layer coating composite 22 and upper-layer coating composite 21 have been applied; the first window portion 34 is covered by the upper-layer coating composite 21, and the lower-layer coating composite 22 is exposed through the second window portion 35, as shown in FIG. 8C. That is, these first and second window portions 34 and 35 are closed or filled by the coating composites 21 and 22, and become almost black as a whole. Hence, a working person can recognize and determine that both of the lower-layer coating composite 22 and the upper-layer coating composite 21 have been applied, by vision. Therefore, also in the third embodiment, operations and effects similar as the first and second embodiments can be obtained.

In the third embodiment, the first and second window portions 34 and 35 are provided in a region of each skirt portion 8 or 9 which conducts a less-frequent or weak slide contact with the cylinder wall-surface 3. Moreover, sizes of the first and second window portions 34 and 35 are sufficiently small as compared with those of the second embodiment. Hence, the first and second window portions 34 and 35 are little influenced by friction so that the generation of abrasion can be further suppressed. Moreover, the freedom degree of design of each skirt portion 8 or 9 in the axial direction is high.

Fourth Embodiment

Figure 9A:
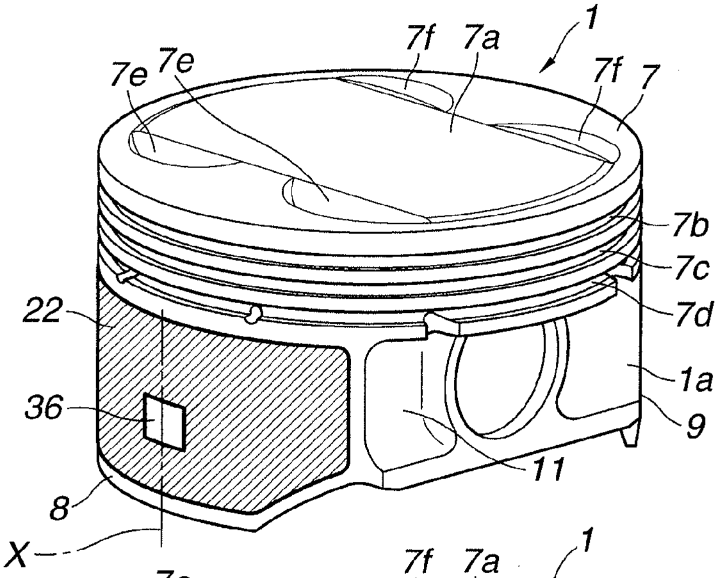
FIGS. 9A to 9C show a formation state of the multiple-layer coating composite applied to the piston in a fourth embodiment according to the present invention.
Figure 9B:
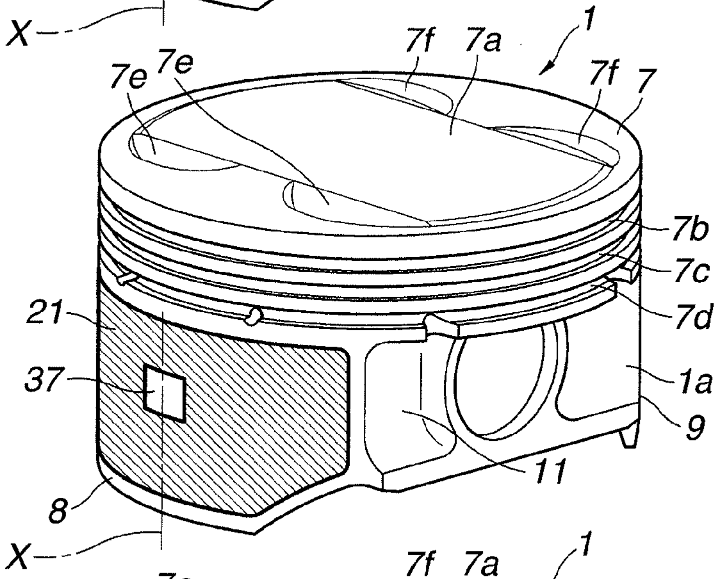
Figure 9C:
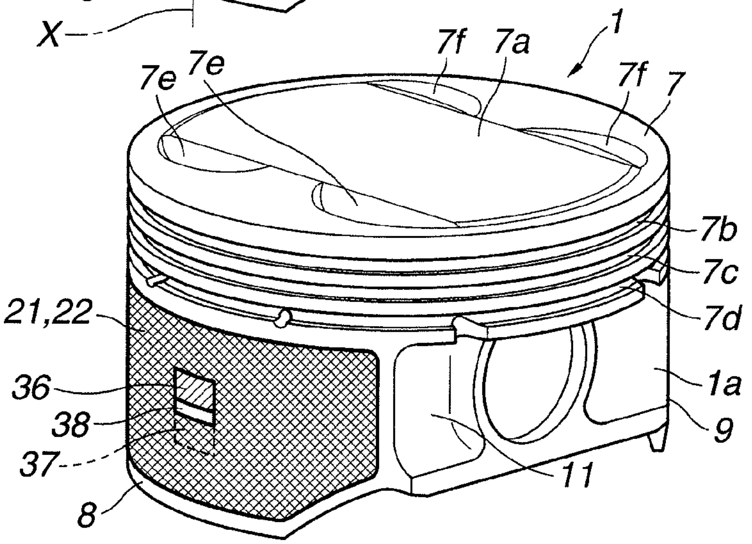

FIGS. 9A to 9C are views showing a fourth embodiment according to the present invention. Basic structure of the fourth embodiment is same as the first embodiment. A first window portion 36 is formed in the lower-layer coating composite 22, and a second window portion 37 is formed in the upper-layer coating composite 21. Each of the first and second window portions 36 and 37 is formed substantially in a square shape. In this fourth embodiment, the forming locations of the first and second window portions 36 and 37 are different from those of the first embodiment.

That is, as shown in FIGS. 9A and 9B, the first and second window portions 36 and 37 are set substantially to have an imaginary common axial line (same axis) X passing through both centers of the first and second window portions 36 and 37 parallel to the axial direction of piston 1. In other words, the first and second window portions 36 and 37 are formed at an approximately identical location with each other, relative to the circumferential direction of the piston 1. The first and second window portions 36 and 37 are provided substantially at a circumferentially center location of each of the thrust-side skirt portion 8 and the counter-thrust-side skirt portion 9. Moreover, the first and second window portions 36 and 37 are formed to be closer to a center of each of the thrust-side skirt portion 8 and the counter-thrust-side skirt portion 9 relative to the axial direction, as compared with those of the first embodiment. That is, the first and second window portions 36 and 37 are closer to each other in the axial direction than the case of the first embodiment. Hence, when both of the lower-layer coating composite 22 and upper-layer coating composite 21 have been applied, a lower part of the first window portion 36 overlaps with an upper part of the second window portion 37 to define a third window portion 38 as shown in FIG. 9C. This third window portion 38 is formed in a strip shape extending in the circumferential direction of the thrust-side skirt portion 8 or the counter-thrust-side skirt portion 9. In this case, the aluminum-alloy surface of the piston base material 1*a* always exposed through the third window portion 38. Moreover, an area (size) of the third window portion 38 is sufficiently small, and a forming location of the third window portion 38 is set in a region which has little slide contact with the cylinder wall-surface 3.

Since the first and second window portions 36 and 37 are formed respectively in the lower-layer coating composite 22 and upper-layer coating composite 21 as mentioned above, a piston including only single layer of coating can be prevented from being distributed as a piston product by mistake. Hence, a reliability of product can be enhanced, in the same manner as the above respective embodiments. Moreover, there is little influence of friction when the thrust-side skirt portion 8 and the counter-thrust-side skirt portion 9 slide in contact with the cylinder wall-surface 3, so that the generation of abrasion can be suppressed.

Moreover, after the lower-layer coating composite 22 and upper-layer coating composite 21 were applied, a radial size (diameter) between the thrust-side skirt portion 8 and the counter-thrust-side skirt portion 9 can be accurately measured by a micrometer or the like by using the radially-opposed pair of third window portions 38 and 38 of both the skirt portions 8 and 9, i.e., by using both the exposed surfaces of the piston base material 1*a*.

Forming locations of both of the first and second window portions 36 and 37 do not necessarily need to be set with high precision relative to the circumferential and axial directions. That is, the first and second window portions 36 and 37 have only to function as the marks of the lower-layer coating composite 22 and upper-layer coating composite 21 and also to form the third window portion 38 securing its size necessary to measure the length between the both skirt portions 8 and 9 even if the shape of third window portion 38 is somewhat deformed.

Fifth Embodiment

Figure 10A:
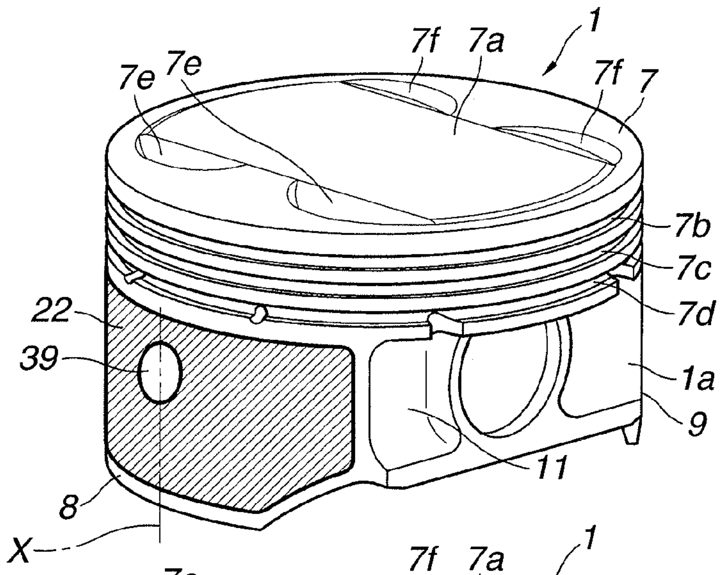
FIGS. 10A to 10C show a formation state of the multiple-layer coating composite applied to the piston in a fifth embodiment according to the present invention.
Figure 10B:
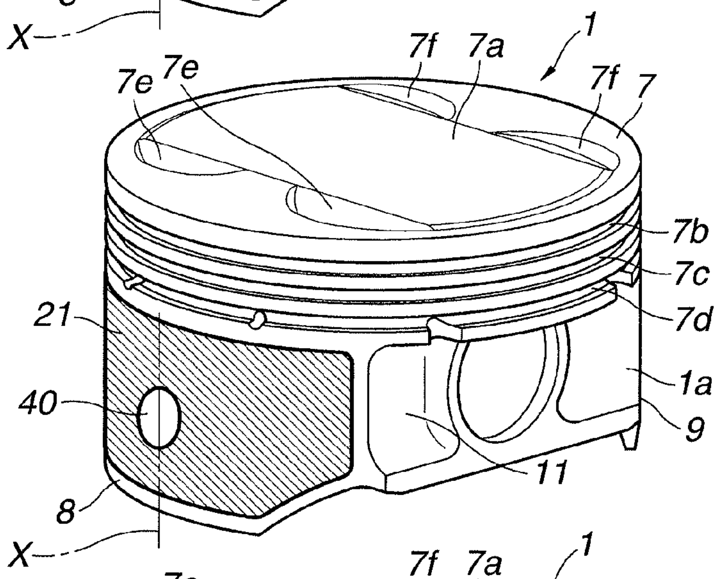
Figure 10C:
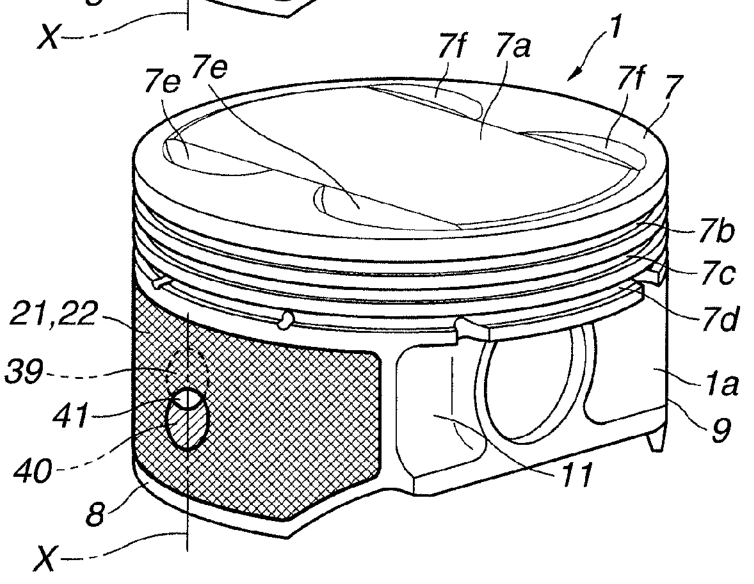

FIGS. 10A to 10C are views showing a fifth embodiment according to the present invention. Basic structure of the fifth embodiment is same as the fourth embodiment. However, in the fifth embodiment, each of first and second window portions 39 and 40 is formed in a circular shape.

That is, as shown in FIGS. 10A and 10B, the first and second window portions 39 and 40 are set substantially to have an imaginary common axial line (same axis) X passing through both centers of the first and second window portions 39 and 40 parallel to the axial direction of piston 1. In other words, the first and second window portions 39 and 40 are formed at an approximately identical location with each other, relative to the circumferential direction of the piston 1. The first and second window portions 39 and 40 are provided substantially at a circumferentially center location of each of the thrust-side skirt portion 8 and the counter-thrust-side skirt portion 9. Moreover, the first and second window portions 36 and 37 are formed to be closer to the center of each of the thrust-side skirt portion 8 and the counter-thrust-side skirt portion 9 relative to the axial direction, as compared with those of the second embodiment. That is, the first and second window portions 39 and 40 are closer to each other in the axial direction than the case of the second embodiment. Hence, when both of the lower-layer coating composite 22 and upper-layer coating composite 21 have been applied, a lower part of the first window portion 39 overlaps with an upper part of the second window portion 40 to define a third window portion 41 as shown in FIG. 10C. This third window portion 41 is formed in a narrow elliptical shape extending in the circumferential direction of the thrust-side skirt portion 8 and the counter-thrust-side skirt portion 9. In this case, the aluminum-alloy surface of the piston base material 1*a* always exposed through the third window portion 41. Moreover, an area of the third window portion 41 is sufficiently small, and a forming location of the third window portion 41 is set in a region which has little slide contact with the cylinder wall-surface 3.

Since the first and second window portions 39 and 40 are formed respectively in the lower-layer coating composite 22 and the upper-layer coating composite 21 as mentioned above, a piston including only single layer of coating can be prevented from being distributed as a piston product by mistake. Hence, a reliability of product can be enhanced, in the same manner as the above respective embodiments. Moreover, there is little influence of friction when the thrust-side skirt portion 8 and the counter-thrust-side skirt portion 9 slide in contact with the cylinder wall-surface 3, so that the generation of abrasion can be suppressed.

Moreover, after the lower-layer coating composite 22 and upper-layer coating composite 21 were applied, the radial size (diameter) between the thrust-side skirt portion 8 and the counter-thrust-side skirt portion 9 can be accurately measured by the micrometer or the like by using the radially-opposed pair of third window portions 41 and 41 of the skirt portions 8 and 9, i.e., by using both the exposed surfaces of the piston base material 1*a*.

Sixth Embodiment

Figure 11A:
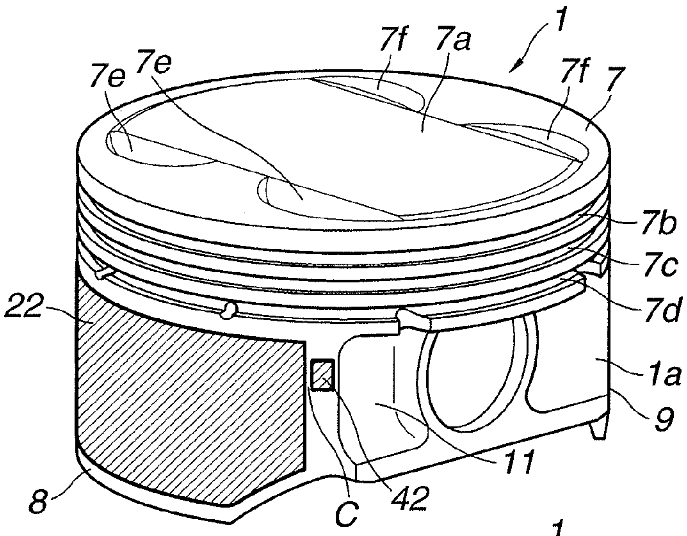
FIGS. 11A to 11C show a formation state of the multiple-layer coating composite applied to the piston in a sixth embodiment according to the present invention.
Figure 11B:
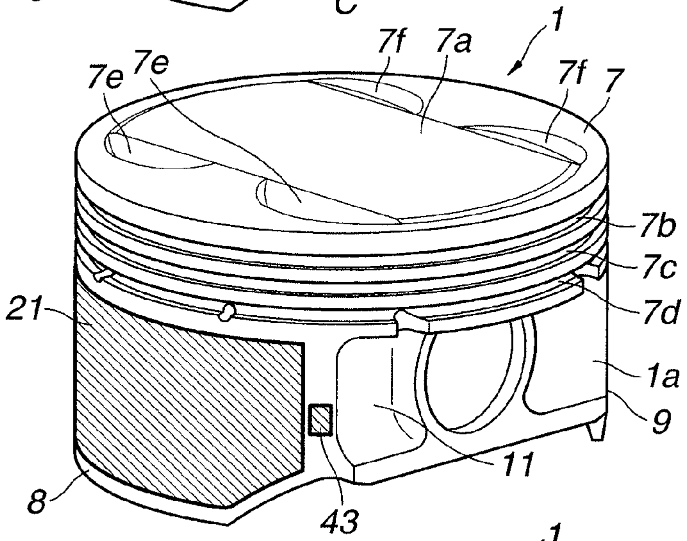
Figure 11C:
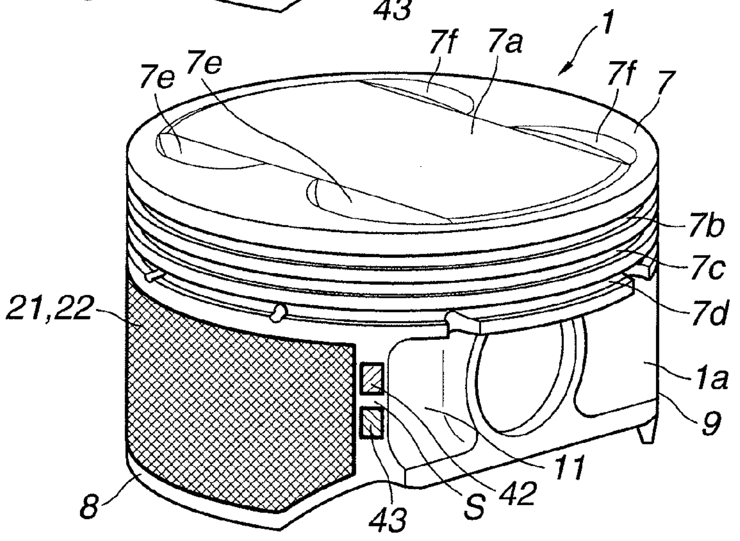

FIGS. 11A to 11C are views showing a sixth embodiment according to the present invention. Although the marks are defined by the window portions in the above respective embodiments, first and second marks 42 and 43 are provided respectively at locations circumferentially outside the lower-layer coating composite 22 and the upper-layer coating composite 21 in the sixth embodiment. The first mark 42 is formed of the same components (i.e., has the same composition of materials) as the lower-layer coating composite 22, and the second mark 43 is formed of the same components (i.e., has the same composition) as the upper-layer coating composite 21.

As shown in FIG. 11A, the first mark 42 is formed as a single-layer coating, together when the lower-layer coating composite 22 is formed. As shown in FIG. 11B, the second mark 43 is formed as a single-layer coating, together when the upper-layer coating composite 21 is formed. Each of the first and second marks 42 and 43 is shaped like a small rectangle. The first and second marks 42 and 43 are located on a circumferentially one end side of each of the skirt portions 8 and 9 and are located in a circumferentially-right region (of FIGS. 11A to 11C) outside the lower-layer coating composite 22 and the upper-layer coating composite 21. That is, the first and second marks 42 and 43 are formed on an outer surface of a connecting region between the skirt portion 8 or 9 and the apron portion 11 or 12. The first and second marks 42 and 43 are respectively away from the lower-layer coating composite 22 and the upper-layer coating composite 21 in the circumferential direction of piston 1, to have a slight clearance (non-coated portion) C between the mark 42 or 43 and the coating composite 22 or 21 as shown in FIG. 11A.

As shown in FIG. 11A, the first mark 42 is located on an upper side of (a circumferential end portion of) the lower-layer coating composite 22, relative to the axial direction of piston 1. On the other hand, as shown in FIG. 11B, the second mark 43 is located on a lower side from a center of (a circumferential end portion of) the upper-layer coating composite 21, relative to the axial direction of piston 1. Moreover, as shown in FIG. 11C, the first and second marks 42 and 43 are away from each other in the axial direction to have a slight axial clearance S therebetween.

Therefore, in this embodiment, if the upper-layer coating composite 21 has not been applied by mistake after the lower-layer coating composite 22 was applied to the piston base material 1*a*, only the first mark 42 has been formed as shown in FIG. 11A. Hence, a working person can recognize and determine that only the lower-layer coating composite 22 has been applied, by visual check.

If the lower-layer coating composite 22 has not been applied by mistake although the upper-layer coating composite 21 has been applied to the piston base material 1*a*, only the second mark 43 has been formed as shown by FIG. 11B. Hence, a working person can recognize and determine that only the upper-layer coating composite 21 has been applied, from the second mark 43 by vision.

Moreover, if both of the lower-layer coating composite 22 and the upper-layer coating composite 21 have been applied, the first mark 42 and the second mark 43 have been formed in upper-and-lower alignment (axial alignment) as shown in FIG. 11C. Hence, a working person can recognize and determine that both of the lower-layer coating composite 22 and the upper-layer coating composite 21 have been applied. In particular, since the first mark 42 and the second mark 43 are apart from the lower-layer coating composite 22 and the upper-layer coating composite 21 by the clearance C, the existence of each of the first and second marks 42 and 43 is easy to recognize from the appearance of the piston 1. Moreover, since the first and second marks 42 and 43 are apart from each other by the large clearance S in the axial direction, it becomes clearer whether the lower-layer coating composite 22 and/or the upper-layer coating composite 21 have not yet been applied to the piston base material 1*a*.

Therefore, a piston including only single layer of coating can be prevented from being distributed as a piston product by mistake. Hence, the reliability of product can be enhanced, in the same manner as the above respective embodiments.

The first mark 42 and the second mark 43 are provided in a region which has a relatively less-frequent or weak slide contact with the cylinder wall-surface 3. Hence, the first mark 42 and the second mark 43 are little influenced by friction so that a generation of abrasion can be suppressed. Moreover, since the first mark 42 and the second mark 43 are formed in the region which does not directly correspond to the skirt portions 8 and 9, a freedom degree of design of the skirt portions 8 and 9 and the marks 42 and 43 is high in the axial direction.

Moreover, the first mark 42 is formed concurrently together with the lower-layer coating composite 22, and the second mark 43 is formed concurrently together with the upper-layer coating composite 21, as mentioned above. Hence, a forming operation for the first mark 42 and the second mark 43 is very easy without requiring any special equipment. Therefore, the rise in cost can also be suppressed.

Seventh Embodiment

Figure 12A:
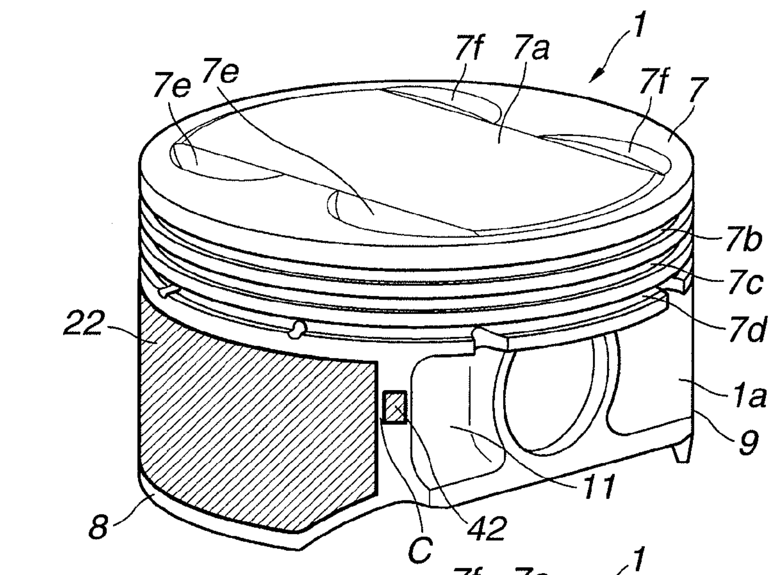
FIGS. 12A to 12C show a formation state of the multiple-layer coating composite applied to the piston in a seventh embodiment according to the present invention.
Figure 12B:
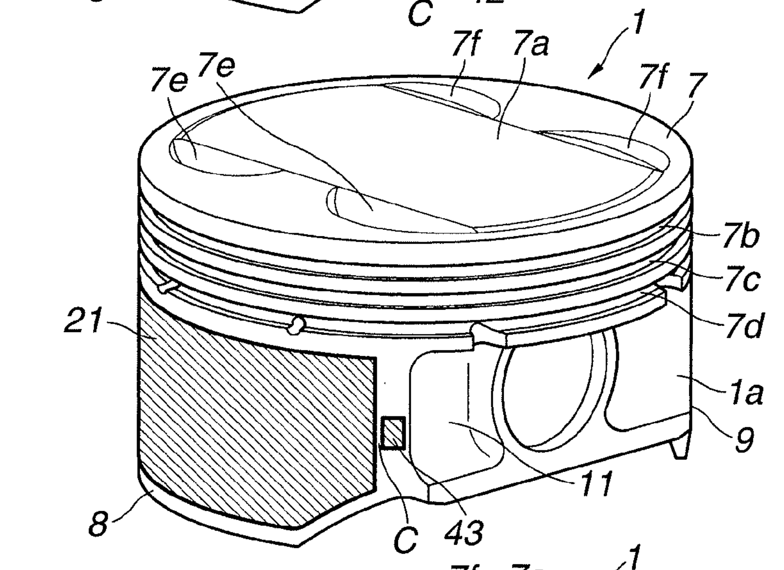
Figure 12C:
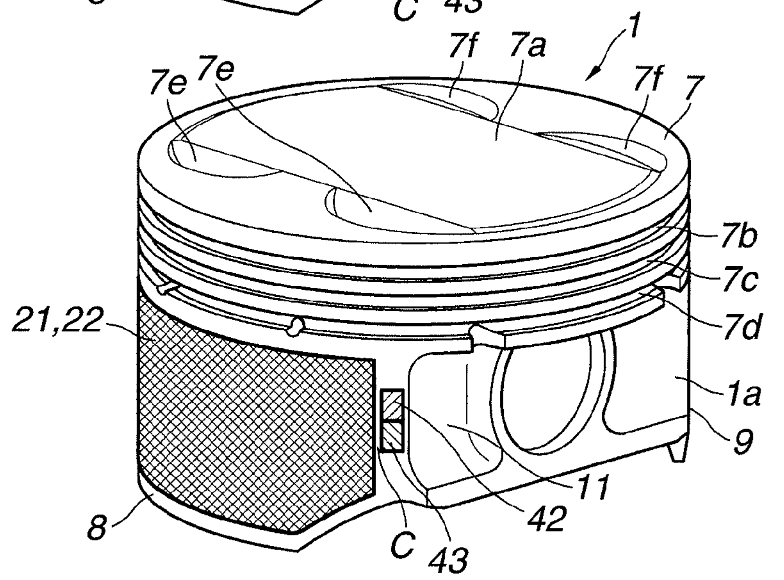

FIGS. 12A to 12C are views showing a seventh embodiment according to the present invention. In the seventh embodiment, the forming locations of the first and second marks 42 and 43 is brought closer to each other in the axial direction as shown in FIGS. 12A and 12B. If only one of the lower-layer coating composite 22 and the upper-layer coating composite 21 has been applied by error, only one of the first and second marks 42 and 43 has already been formed. If both of the lower-layer coating composite 22 and the upper-layer coating composite 21 have been applied, both the marks 42 and 43 have been combined with each other in the up-down direction (i.e., the axial direction) so that an axially-elongated rectangular mark is formed as a whole as shown in FIG. 12C.

Accordingly, operations and effects similar as the fifth embodiment can be obtained. In addition, since the mutually-combined first and second marks 42 and 43 form the elongated rectangular shape, a visibility for the working person becomes more favorable to enable a quick recognition or determination.

Also in the seventh embodiment, the first and second marks 42 and 43 are apart from the lower-layer coating composite 22 and the upper-layer coating composite 21 by the clearance C. Hence, also from this point of view, the recognition by vision is easy in the same manner as the fifth embodiment.

Eighth Embodiment

Figure 13A:
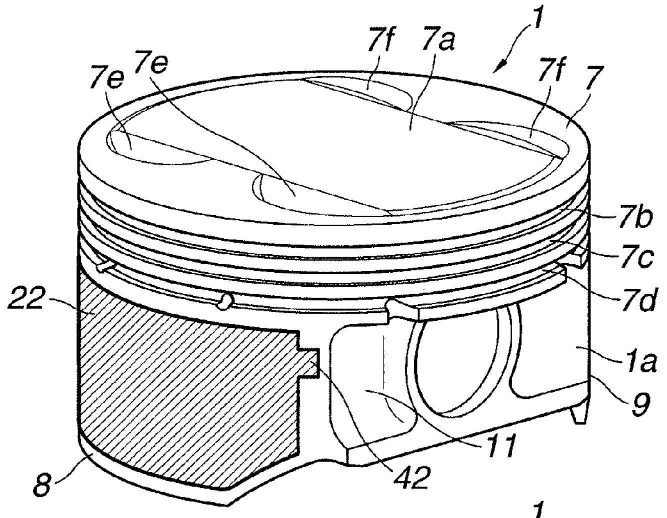
FIGS. 13A to 13C show a formation state of the multiple-layer coating composite applied to the piston in an eighth embodiment according to the present invention.
Figure 13B:
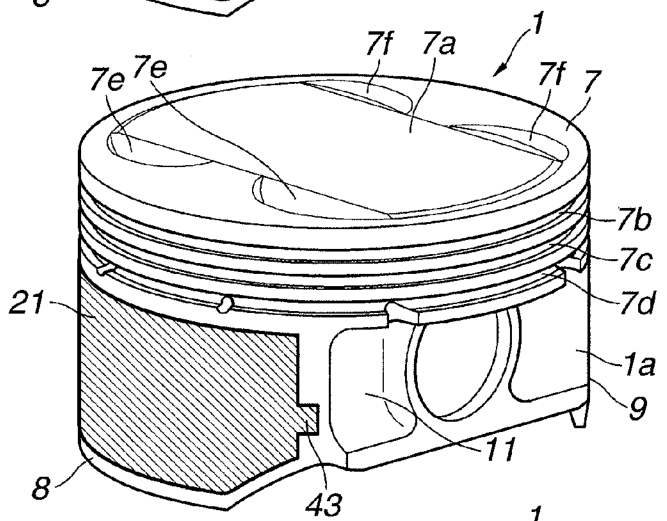
Figure 13C:
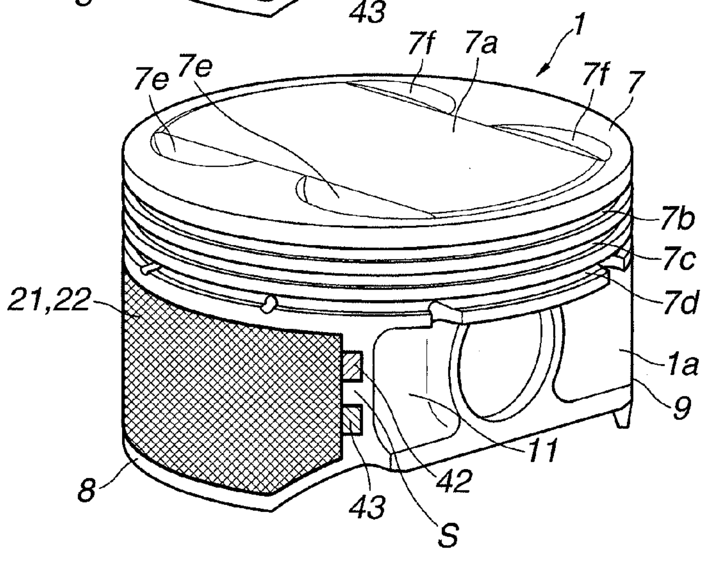

FIGS. 13A to 13C are views showing an eighth embodiment according to the present invention. In the eighth embodiment, the forming locations of the first and second marks 42 and 43 are changed from those of the sixth and seventh embodiments. In the eighth embodiment, the first mark 42 is formed to be continuous with (i.e., to be connected with) one circumferential edge of the lower-layer coating composite 22, and the second mark 43 is formed to be continuous with (i.e., to be connected with) one circumferential edge of the upper-layer coating composite 21. That is, when the lower-layer coating composite 22 is applied to the surface of the skirt portion 8 or 9, the first mark 42 is concurrently formed so as to be continuous with the lower-layer coating composite 22. The first mark 42 protrudes from the circumferential end (right end of FIG. 13A) of the lower-layer coating composite 22 in the circumferential direction. On the other hand, when the upper-layer coating composite 21 is applied to the surface of (the lower-layer coating composite 22 of) the skirt portion 8 or 9, the second mark 43 is concurrently formed so as to be continuous with the upper-layer coating composite 21. The second mark 43 protrudes from the circumferential end (right end of FIG. 13A) of the upper-layer coating composite 21 in the circumferential direction. There is a clearance S between both of the first and second marks 42 and 43 as shown in FIG. 13C.

In the eighth embodiment, operations and effects similar as the above respective embodiments can be obtained. In addition, since the first and second marks 42 and 43 are continuous with the lower-layer coating composite 22 and the upper-layer coating composite 21, the forming operation for the first and second marks 42 and 43 is easy. Moreover, the visibility for the working person is favorable because of the existence of the clearance S.

Ninth Embodiment

Figure 14A:
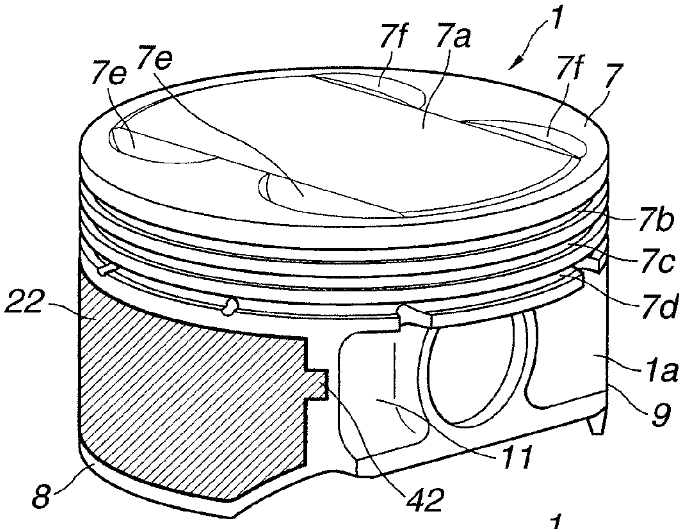
FIGS. 14A to 14C show a formation state of the multiple-layer coating composite applied to the piston in a ninth embodiment according to the present invention.
Figure 14B:
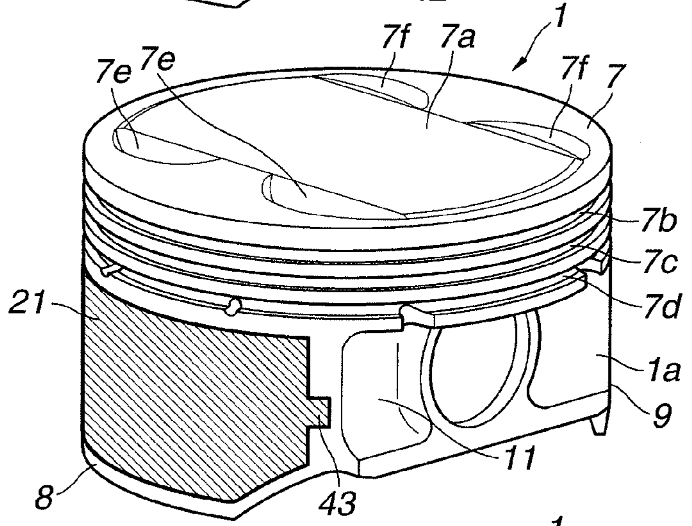
Figure 14C:
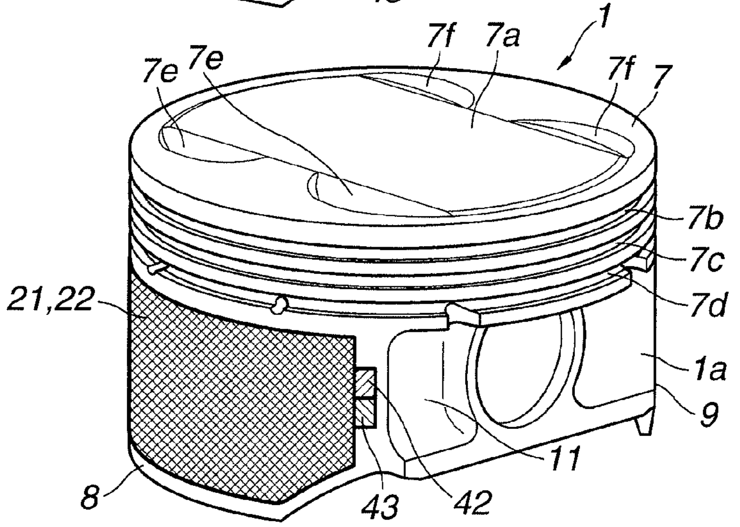

FIGS. 14A to 14C are views showing a ninth embodiment according to the present invention. Basic structure in the ninth embodiment is similar as the eighth embodiment. The first and second marks 42 and 43 are formed concurrently with the application of the lower-layer coating composite 22 and the upper-layer coating composite 21 in the same manner as the eighth embodiment. In this ninth embodiment, the forming locations of the first and second marks 42 and 43 are moved toward a center portion of (a circumferential end portion of) the coating composite 22 or 21 in the axial direction of piston 1. Accordingly, if both of the lower-layer coating composite 22 and the upper-layer coating composite 21 have been applied without mistake, the first and second marks 42 and 43 are combined with each other from the up and down directions (i.e., in the axial direction) as shown in FIG. 14C.

Therefore, also in this ninth embodiment, operations and effects similar as the eighth embodiment can be obtained. In addition, since the first and second marks 42 and 43 are connected with each other in the axial direction so that an axially-elongated rectangular mark is formed, the visibility for the working person is favorable.

Tenth Embodiment

Figure 15A:
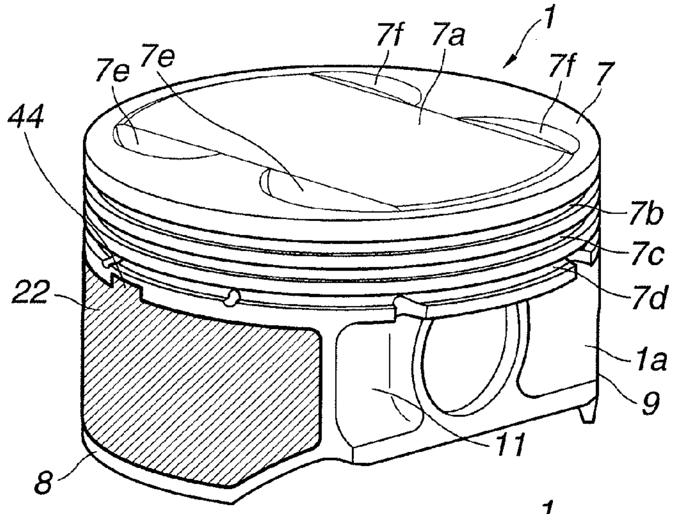
FIGS. 15A to 15C show a formation state of the multiple-layer coating composite applied to the piston in a tenth embodiment according to the present invention.
Figure 15B:
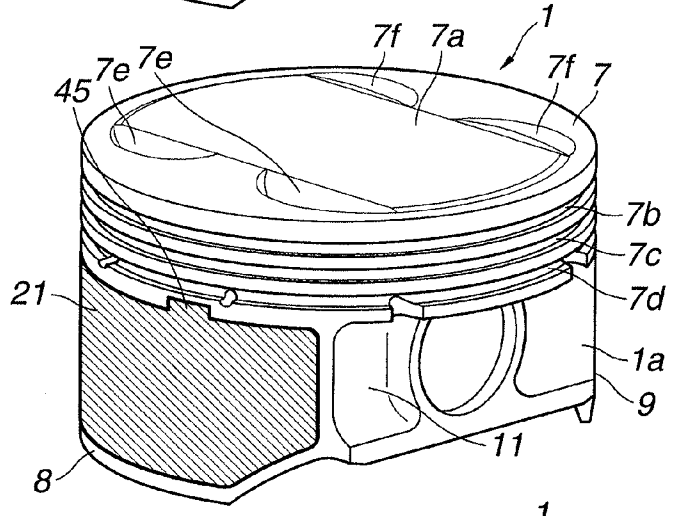
Figure 15C:
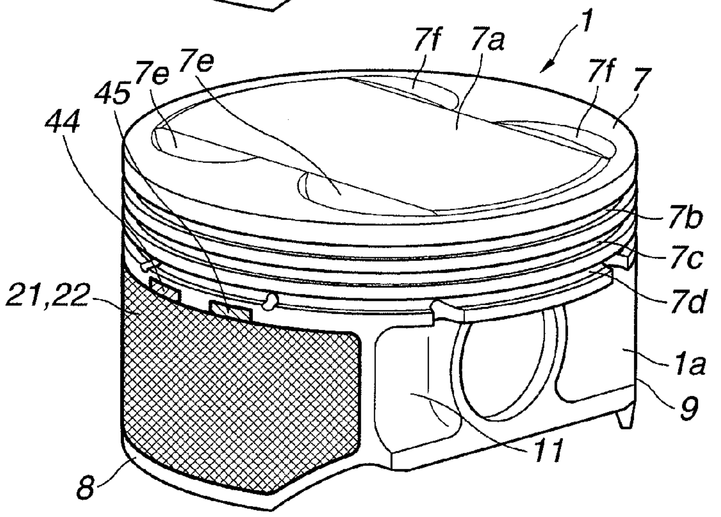

FIGS. 15A to 15C are views showing a tenth embodiment according to the present invention. In the tenth embodiment, rectangular first and second marks 44 and 45 are provided on upper end portions of the skirt portions 8 and 9. That is, the rectangular first mark 44 is formed to be continuous with an upper edge (crown-side edge) of the lower-layer coating composite 22. On the other hand, the rectangular second mark 45 is formed to be continuous with an upper edge (crown-side edge) of the upper-layer coating composite 21.

The first mark 44 is located substantially at a circumferentially-center portion of the upper edge of the lower-layer coating composite 22. On the other hand, the second mark 45 is located on a right side (of FIGS. 15A to 15C) beyond a circumferentially-center portion of the upper edge of the upper-layer coating composite 21. Thereby, both of the first and second marks 44 and 45 are arranged in right-and-left alignment (circumferential alignment) to have a predetermined clearance between the first and second marks 44 and 45.

Therefore, operations and effects similar as the ninth embodiment and the like can be obtained.

Eleventh Embodiment

Figure 16A:
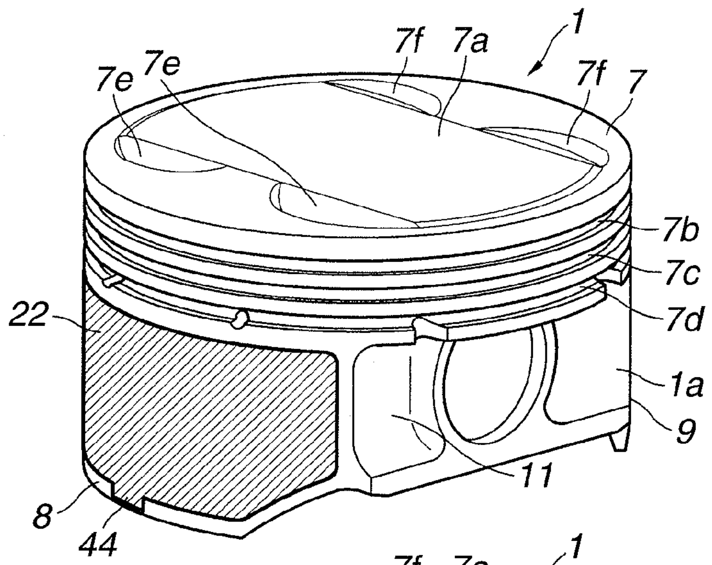
FIGS. 16A to 16C show a formation state of the multiple-layer coating composite applied to the piston in an eleventh embodiment according to the present invention.
Figure 16B:
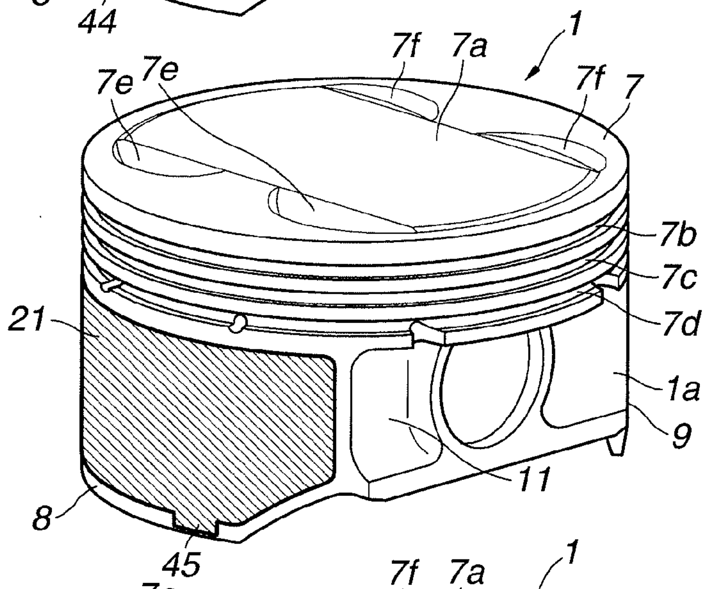
Figure 16C:
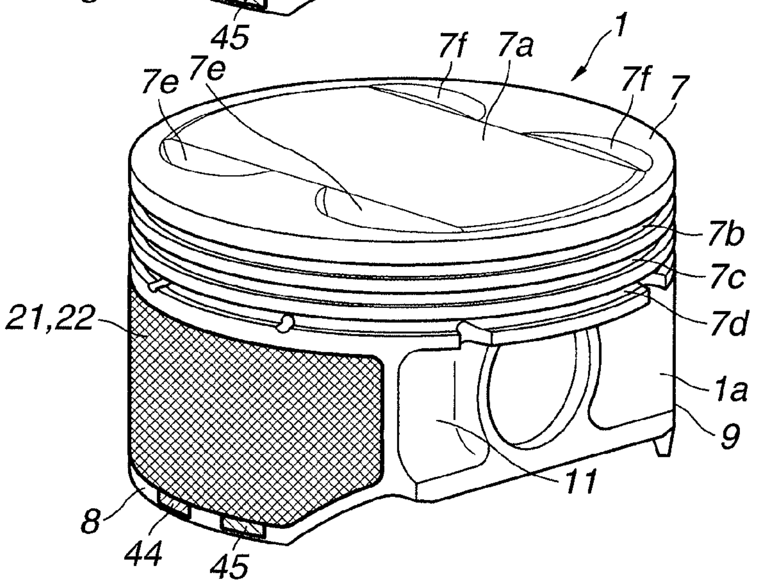

FIGS. 16A to 16C are views showing an eleventh embodiment according to the present invention. In the eleventh embodiment, rectangular first and second marks 44 and 45 are provided on lower end sides of the skirt portions 8 and 9. That is, the rectangular first mark 44 is formed to be continuous with a lower edge (counter-crown-side edge) of the lower-layer coating composite 22. On the other hand, the rectangular second mark 45 is formed to be continuous with a lower edge (counter-crown-side edge) of the upper-layer coating composite 21.

The first mark 44 is located substantially at a circumferentially-center portion of the lower edge of the lower-layer coating composite 22. On the other hand, the second mark 45 is located on the right side (of FIGS. 15A to 15C) beyond a circumferentially-center portion of the lower edge of the upper-layer coating composite 21. Thereby, both of the first and second marks 44 and 45 are arranged in right-and-left alignment (circumferential alignment) to have a predetermined clearance between the so first and second marks 44 and 45.

Therefore, operations and effects similar as the ninth embodiment and the like can be obtained.

According to the tenth and eleventh embodiments, the forming locations of the first and second marks 44 and 45 may be set to cause the first and second marks 44 and 45 to be combined with each other in the circumferential direction when both of the lower-layer coating composite 22 and the upper-layer coating composite 21 are applied.

Twelfth Embodiment

Figure 17A:
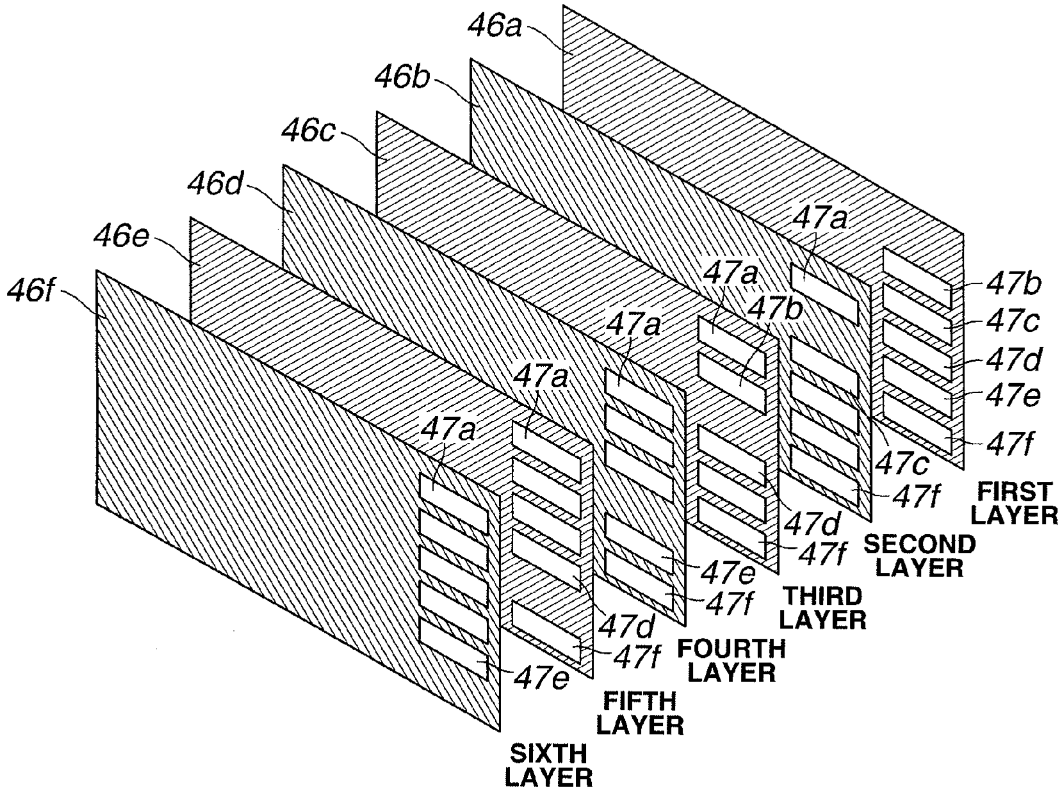
FIGS. 17A to 17C show coating-treatment patterns of respective layers of a multiple-layer coating composite which is applied to the piston in a twelfth embodiment according to the present invention.
Figure 17B:
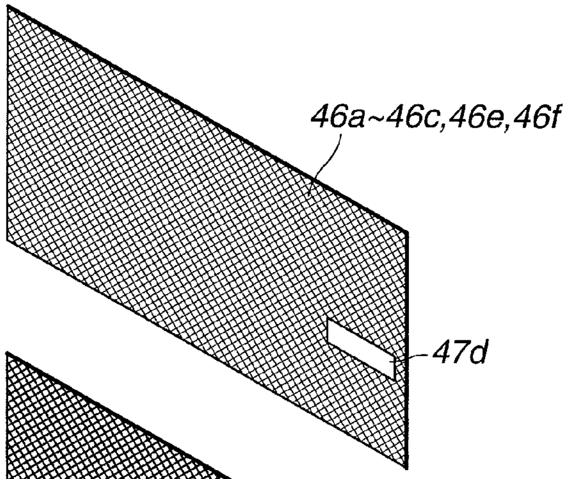
Figure 17C:
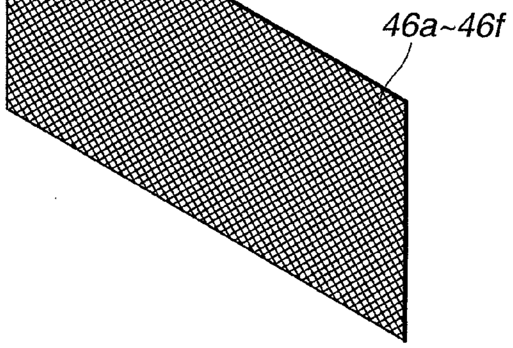

FIGS. 17A to 17C are views showing a twelfth embodiment according to the present invention. Although the multiple-layer coating composite 20 is constituted by two layers of the lower-layer coating composite 22 and the upper-layer coating composite 21 in the above respective embodiments, a multiple-layer coating composite in the twelfth embodiment is constituted by three layers or more.

In this twelfth embodiment, as shown in FIG. 17A, first-layer to sixth-layer coating composites 46*a* to 46*f* are applied to the outer surface of each of the thrust-side skirt portion 8 and the counter-thrust-side skirt portion 9. As shown in FIG. 17A, a plurality of window portions 47*a* to 47*f* are formed in the first-layer to sixth-layer coating composites 46*a* to 46*f*. Each of the plurality of window portions 47*a* to 47*f* is formed as a circumferentially-elongated mark, and is located in a circumferentially end portion (right side of FIG. 17) of each of the first-layer to sixth-layer coating composites 46*a* to 46*f*.

These window portions 47*a* to 47*f* are located in the circumferentially end side (right side) of each of the first-layer to sixth-layer coating composites 46*a* to 46*f*, and arranged axially in a row at even intervals. Each layer of the first-layer to sixth-layer coating composites 46*a* to 46*f* has five windows (6-1) selected from the window portions 47*a* to 47*f*. Each of the first-layer to sixth-layer coating composites 46*a* to 46*f* is exposed to the outside of the piston 1 through the corresponding window portion given from the window portions 47*a* to 47*f*.

That is, as shown in FIG. 17A, the first-layer coating composite 46*a* includes the second to sixth window portions 47*b* to 47*f* formed in second to sixth steps (lines) without including the first window portion 47*a* of a top step (line). The second-layer coating composite 46*b* includes the first window portion 47*a* formed in the top step and the third to sixth window portions 47*c* to 47*f* formed in the third to sixth steps without including the second window portion 47*b*. The third-layer coating composite 46*c* includes the first and second window portions 47*a* and 47*b* and the fourth to sixth window portions 47*d* to 47*f* without including the third window portion 47*c*. The forth-layer coating composite 46*d* includes the first to third window portions 47*a* to 47*c* and the fifth and sixth window portions 47*e* and 47*f* without including the fourth window portion 47*d*. The fifth-layer coating composite 46*e* includes the first to fourth window portions 47*a* to 47*d* and the sixth window portion 47*f* without including the fifth window portion 47*e*. The sixth-layer coating composite 46*f* includes the first to fifth window portions 47*a* to 47*e* without including the sixth window portion 47*f* of a bottom step (lowest line).

Accordingly, for example, if the application of the fourth-layer coating composite 46*d* was forgotten, the fourth window portion 47*d* has been formed in all of the other coating composites 46*a*-46*c*, 46*e* and 46*f*. Hence, as shown in FIG. 17B, the aluminum-alloy surface of the piston base material 1*a* exposed to the outside through all of the fourth window portions 47*d* because each fourth window portion 47*d* has not been closed or filled.

Therefore, the working person can recognize and determine that the fourth-layer coating composite 46*d* has not been applied, by visibly recognizing the aluminum-alloy surface exposed from the fourth window portion 47*d*. As a result, a piston product having its coating failure can be sufficiently prevented from being distributed, in the same manner as the above embodiments. Hence, the reliability of product is enhanced.

If all of the first-layer to sixth-layer coating composites 46*a* to 46*f* have been applied without mistake, all of the window portions 47*a* to 47*f* have been closed or filled by the first-layer to sixth-layer coating composites 46*a* to 46*f* so that no window portion (having the color near silver) is left as shown in FIG. 17C. Hence, the working person can visibly recognize that all of the first-layer to sixth-layer coating composites 46*a* to 46*f* have been applied without mistake.

Thirteenth Embodiment

Figure 18A:
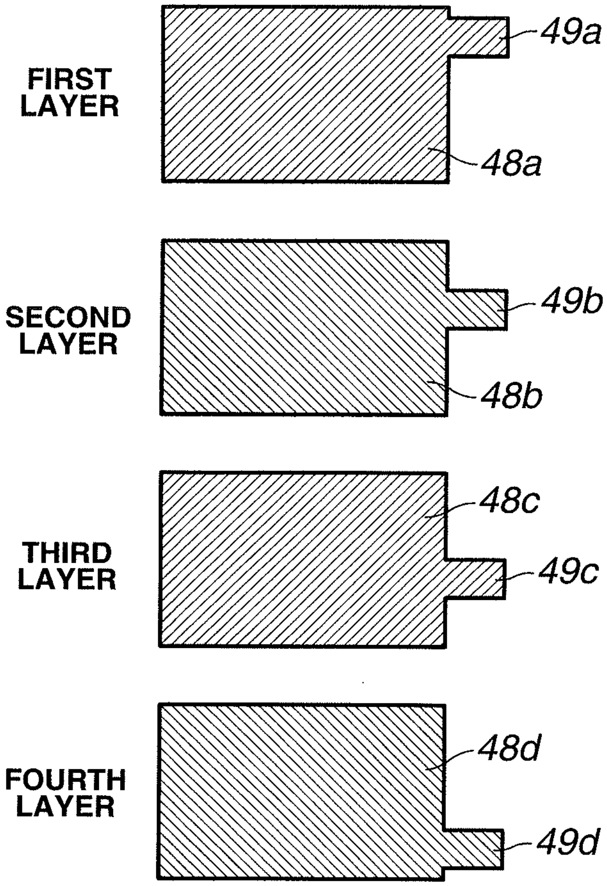
FIGS. 18A to 18C show coating-treatment patterns of respective layers of a multiple-layer coating composite which is applied to the piston in a thirteenth embodiment according to the present invention.
Figure 18B:
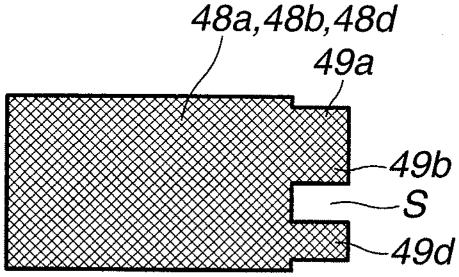
Figure 18C:
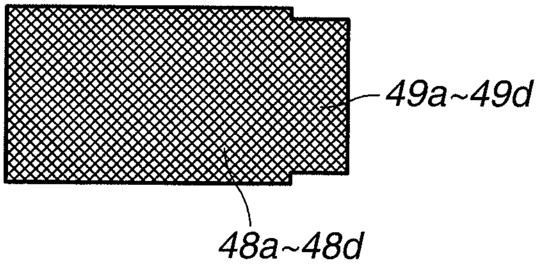

FIGS. 18A to 18C are views showing a thirteenth embodiment according to the present invention. In the thirteenth embodiment, the multiple-layer coating composite which is applied on the outer surfaces of the thrust-side skirt portion 8 and the counter-thrust-side skirt portion 9 is constituted by four layers 48*a* to 48*d*. As shown in FIG. 18A, first to fourth four marks 49*a* to 49*d* which are elongated in the circumferential direction are formed on circumferential edges (on right edges of FIG. 18A) of the first-layer to fourth-layer coating composites 48*a* to 48*d*, to be continuous with the first-layer to fourth-layer coating composites 48*a* to 48*d*.

The first to fourth marks 49*a* to 49*d* are respectively formed integrally with the circumferential (right) edges of the first-layer to fourth-layer coating composites 48*a* to 48*d*. The first to fourth marks 49*a* to 49*d* are arranged in a row in the axial direction (up-down direction). There is no space between adjacent two of the first to fourth marks 49*a* to 49*d* in the axial direction. That is, forming locations of the first to fourth marks 49*a* to 49*d* are set to combine the first to fourth marks 49*a* to 49*d* integrally with one another (from upper and lower directions) as axially-extending one mark when all of the first-layer to fourth-layer coating composites 48*a* to 48*d* are properly applied, as shown in FIG. 18C.

In detail, as shown in FIG. 18A, the first mark 49*a* is formed integrally with the circumferential edge of the first-layer coating composite 48*a* at an axially upmost portion (a top-step portion) of the first-layer coating composite 48*a*. The second mark 49*b* is formed integrally with the circumferential edge of the second-layer coating composite 48*b* at a second-step portion which is axially shifted in the lower direction from the location of the first mark 49*a* by an axial width of each mark. In the same manner, the third mark 49*c* is formed integrally with the circumferential edge of the third-layer coating composite 48*c* at a third-step portion which is axially shifted in the lower direction from the location of the second mark 49*b* by the axial width of each mark. In the same manner, the is fourth mark 49*d* is formed integrally with the circumferential edge of the fourth-layer coating composite 48*d* at a bottom-step portion which is axially shifted in the lower direction from the location of the third mark 49*c* by the axial width of each mark.

Accordingly, for example, if only the third-layer coating composite 48*c* has not been applied by mistake, the first and second marks 49*a* and 49*b* and the fourth mark 49*d* have been formed except the third mark 49*c*. Hence, the combined shape of the marks 49*a*, 49*b* and 49*d* is in a state cut (chipped) by the location S of the third mark 49*c*, as shown in FIG. 18B. Hence, the aluminum-alloy surface of the piston base material 1*a* exposed to the outside through the location S of the third mark 49*c*.

Therefore, the working person can recognize and determine that the third-layer coating composite 48*c* has not been applied, by visibly recognizing the aluminum-alloy surface exposed from the cutout location S of the third mark 49*c*. As a result, a piston product having its failure can be sufficiently prevented from being distributed, in the same manner as the above embodiments. Hence, the reliability of product is enhanced.

Fourteenth Embodiment

Figure 19A:
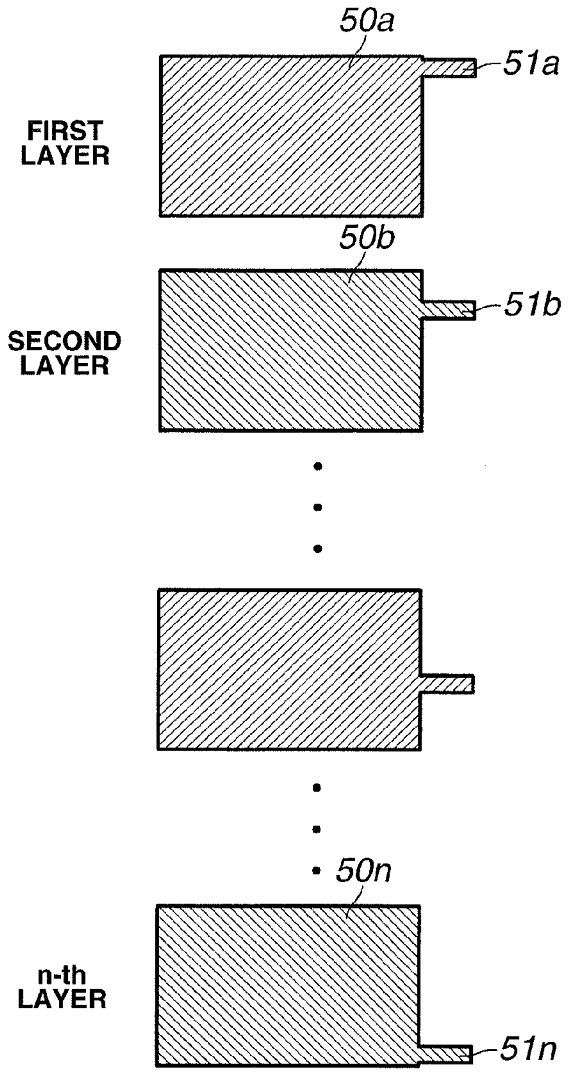
FIGS. 19A to 19C show coating-treatment patterns of respective layers of a multiple-layer coating composite which is applied to the piston in a fourteenth embodiment according to the present invention.
Figure 19B:
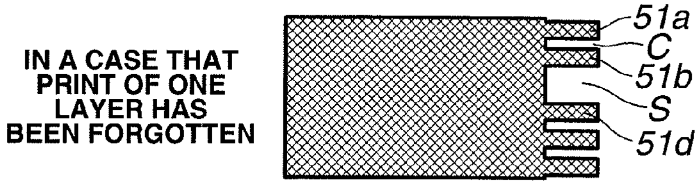
Figure 19C:
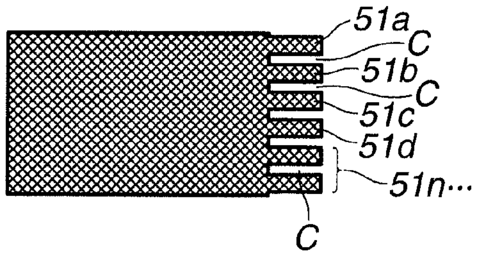

FIGS. 19A to 19C are views showing a fourteenth embodiment according to the present invention. In the fourteenth embodiment, the structure according to the thirteenth embodiment is further developed. In the fourteenth embodiment, the multiple-layer coating composite which is applied on the outer surfaces of the thrust-side skirt portion 8 and the counter-thrust-side skirt portion 9 is constituted by a lot of layers 50*a* to 50*n*. As shown in FIG. 19A, first to nth marks 51*a* to 51*n* which are elongated in the circumferential direction are formed on circumferential edges (on right edges of FIG. 19A) of the first-layer to nth-layer coating composites 50*a* to 50*n*. In the same manner as the thirteenth embodiment, the first to nth marks 51*a* to 51*n* are integrally formed respectively with the first-layer to nth-layer coating composites 50*a* to 50*n*.

As shown in FIG. 19C, the forming locations of the first to nth marks 51*a* to 51*n* are set to arrange the first to nth marks 51*a* to 51*n* in a row in the axial direction (up-down direction) when all of the first-layer to nth-layer coating composites 50*a* to 50*n* have been applied. At this time, there is a predetermined clearance C between adjacent two of the first to nth marks 51*a* to 51*n* in the axial direction, as shown in FIG. 19C.

Accordingly, for example, if only the third-layer coating composite 50*c* has not been applied by mistake, the first and second marks 51*a* and 51*b* and the fourth to nth marks 51*d* to 51*n* have been formed except the third mark 51*c*. Hence, the combined shape of the marks 51*a*, 51*b* and 51*d*-51*n* is in a state cut (chipped) by the location S of the third mark 51*c*, as shown in FIG. 19B. Hence, the aluminum-alloy surface of the piston base material 1*a* is exposed to the outside through the location S of the third mark 51*c*.

Therefore, the working person can recognize and determine that the third-layer coating composite 50*c* has not been applied, by visibly recognizing the aluminum-alloy surface exposed from the cutout location S of the third mark 51*c*. As a result, a piston product having its failure can be sufficiently prevented from being distributed, in the same manner as the above embodiments. Hence, the reliability of product is enhanced.

As explained above, even in the case that the multiple-layer coating includes three or more layers as in the twelfth to fourteenth embodiments, it can be judged whether or not the multiple-layer coating has been properly formed, by use of the marks (window portions).

Fifteenth Embodiment

FIGS. 20A to 20C and FIG. 21A are views showing a fifteenth embodiment according to the present invention. In the fifteenth embodiment, forming locations of the first and second marks 42 and 43 are same as the eighth embodiment shown by FIG. 13. However, in the fifteenth embodiment, when the lower-layer coating composite 22 is applied to the thrust-side skirt portion 8 and the counter-thrust-side skirt portion 9 of the piston 1 together with the first mark 42, a plurality of black-dot coating portions (partly coating portions) 52 each formed of the same components (i.e., having the same composition of materials) as the lower-layer coating composite 22 are dispersed or scattered within a region 53 in which the second mark 43 of the upper-layer coating composite 21 is scheduled to be formed. That is, the plurality of black-dot coating portions 52 are provided as a part of the lower-layer coating composite 22.

Figure 20A:
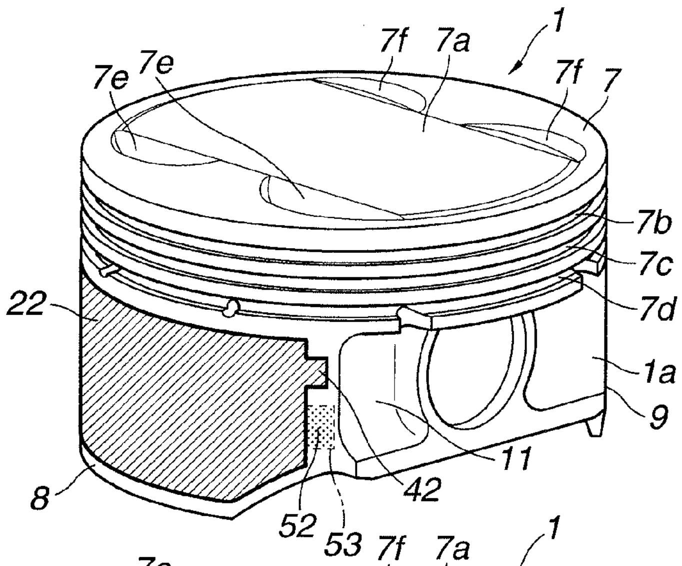
FIGS. 20A to 20C show a formation state of a multiple-layer coating composite applied to the piston in a fifteenth embodiment according to the present invention.
Figure 20B:
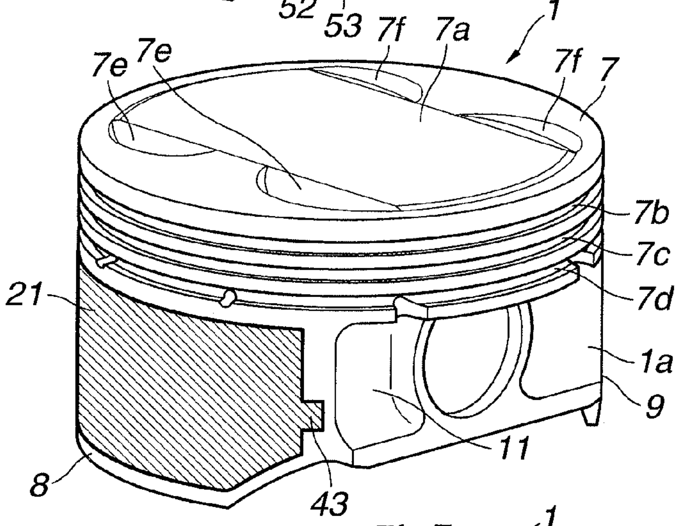
Figure 20C:
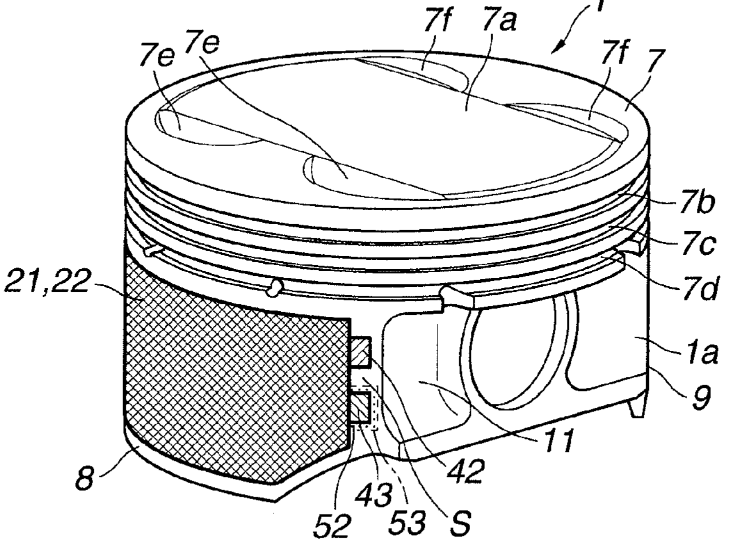

That is, at first, the lower-layer coating composite 22 and the first mark 42 are applied to the surfaces of both skirt portions 8 and 9 of the piston 1 by the above-mentioned method. At the same time, the plurality of black-dot coating portions 52 constituting a part of the lower-layer coating composite 22 are applied to a location to which the second mark 43 of the upper-layer coating composite 21 will be applied in a next process. Thereby, whole (aggregate) of the black-dot coating portions 52 defines a partly-coating-portion forming region 53 as shown in FIG. 20A.

Figure 21A:
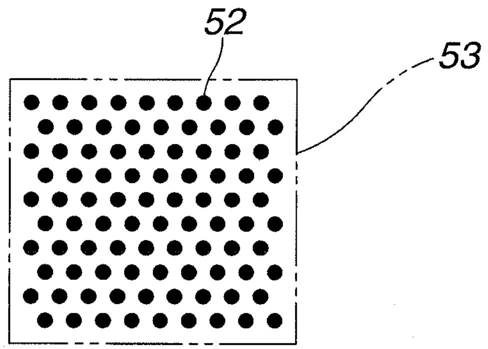
FIG. 21A is a view showing a partly coating portion of the lower-layer coating composite in a first example according to the fifteenth embodiment.

As shown in FIG. 21A, each of the black-dot coating portions 52 is formed in a small circle shape having its diameter approximately equal to a few millimeters. The black-dot coating portions 52 are dispersed from one another to have a predetermined distance between adjacent two of the black-dot coating portions 52. Thereby, whole of the black-dot coating portions 52 forms the partly-coating-portion forming region 53 which is a bit larger than outer dimensions of the second mark 43. The partly-coating-portion forming region 53 is formed substantially in a square shape including polka dots. The surface of the piston base material 1*a*, i.e., the surface of aluminum alloy is exposed through spaces given between the black-dot coating portions 52.

A total overlapping area between the black-dot coating portions 52 and the second mark 43 can be set within a range from 10% to 85% of an area of the second mark 43. That is, the black-dot coating portions 52 can be formed to cause parts of the second mark 43 which completely overlap with (i.e., cover) the black-dot coating portions 52 in a thickness direction of the multiple-layer coating composite 20, to have its area falling within a range between 10% and 85% of the area of the second mark 43. In this example according to the fifteenth embodiment, the total overlapping area is set approximately at 50% of the area of the second mark 43.

Therefore, in the fifteenth embodiment, a piston product including only single layer of coating can be prevented from being distributed by mistake, because of the existence of the marks 42 and 43, in the same manner as the above embodiments. Moreover, when the upper-layer coating composite 21 is applied to the upper surface of the lower-layer coating composite 22, the second mark 43 is concurrently bound to the black-dot coating portions 52 in addition to the surface of the piston base material 1*a* exposed through the spaces between the black-dot coating portions 52 in the partly-coating-portion forming region 53. Hence, the second mark 43 can be strongly bound to the piston 1 in the partly-coating-portion forming region 53.

That is, the second mark 43 is bound with (adheres to) the surface of the piston base material 1*a* and is also bound with the scattered black-dot coating portions 52, in the partly-coating-portion forming region 53. The second mark 43 is strongly bound to the respective black-dot coating portions 52 on the principle that the upper-layer coating composite 21 is strongly bound to the lower-layer coating composite 22. Accordingly, the second mark 43 is prevented from being carelessly detached from the surface of the piston 1 after the upper-layer coating composite 21 was formed on the lower-layer coating composite 22. As a result, by using the above-mentioned marks 42 and 43, it can be determined whether or not the multiple-layer coating composite 20 includes only a single layer, always with certainty.

Moreover, since the partly-coating-portion forming region 53 is formed more largely than the area (dimensions) of the second mark 43, the second mark 43 is not formed outside the partly-coating-portion forming region 53.

Other Patterns of Partly Coating Portion 52

Figure 21B:
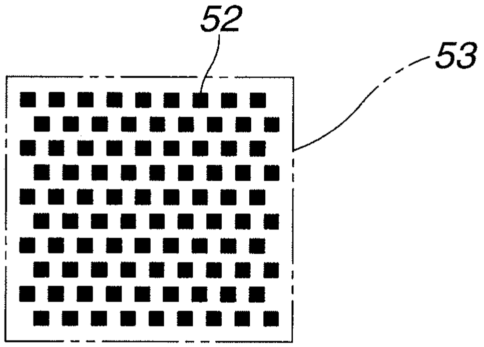
FIG. 21B is a view showing a partly coating portion of the lower-layer coating composite in a second (modified) example according to the fifteenth embodiment.
Figure 21C:
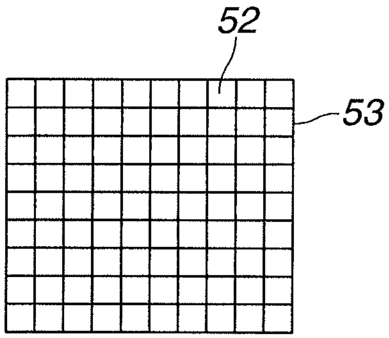
FIG. 21C is a view showing a partly coating portion of the lower-layer coating composite in a third example according to the fifteenth embodiment.
Figure 21D:
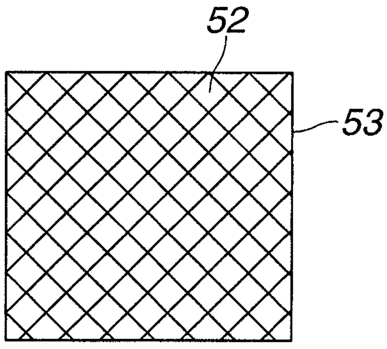
FIG. 21D is a view showing a partly coating portion of the lower-layer coating composite in a fourth example according to the fifteenth embodiment.

Although the black-dot coating portions 52 each shaped like a small circle have been explained as shown in FIGS. 20A-20C and FIG. 21A, various shapes and patterns can be employed as the partly coating portion(s) 52. For example, as shown in FIG. 21B, each of the partly coating portions 52 may be formed in a small square shape instead of the small circular shape. Alternatively, each of the partly coating portions 52 may be formed in a small triangular shape. Moreover, as shown in FIG. 21C, the partly coating portion 52 may be formed in a lattice shape (e.g., a square grid shape) within the partly-coating-portion forming region 53, instead of the plurality of dots. As shown in FIG. 21D, the partly coating portion 52 can also be formed in a square-cross-hatched shape.

The various kinds of partly coating portions 52 are applicable to all of the embodiments explained above. In the first to fifth embodiments shown in FIGS. 6A to 10C, the partly coating portion(s) 52 can be formed within the first window portion 30, 32, 34, 36 or 39.

Moreover, in the sixth to eleventh embodiments as shown in FIGS. 11A to 16C, the partly coating portion(s) 52 can be formed within a region (the partly-coating-portion forming region 53) in which the second mark 43 or 45 of the upper-layer coating composite 21 is scheduled to be formed. In this case, the partly coating portion(s) 52 are formed concurrently when the lower-layer coating composite 22 is applied to the piston base material 1*a*.

Moreover, in the twelfth embodiment as shown in FIGS. 17A to 17C, for example if the fifth-layer coating composite 46*e* has a low adhesion property (low binding property) against the piston base material 1*a* but has a high adhesion property against the third-layer coating composite 46*c*, the partly coating portion(s) 52 is formed within the fifth window portion 47*e* of the third-layer coating composite 46*c* that has the plurality of window portions because the fifth-layer coating composite 46*e* is scheduled to cover the fifth window portion 47*e*.

Moreover, in the thirteenth embodiment as shown in FIGS. 18A to 18C, for example if the fourth-layer coating composite 48*d* has a low adhesion property against the piston base material 1*a* but has a high adhesion property against the second-layer coating composite 48*b*, the partly coating portion(s) 52 is formed (to be continuous) with the second-layer coating composite 48*b* at a location corresponding to the forming location of the fourth mark 49*d* of the fourth-layer coating composite 48*d*.

Moreover, in the fourteenth embodiment as shown in FIGS. 19A to 19C, for example if the nth-layer coating composite 50*n* has a low adhesion property against the piston base material 1*a* but has a high adhesion property against the mth-layer coating composite 50*m*, the partly coating portion(s) 52 is formed (to be continuous) with the mth-layer coating composite 50*m* at a location corresponding to the forming location of the nth mark 51*n* of the nth-layer coating composite 50*n*.

Therefore, in the case that the partly coating portion(s) 52 is formed in the window portion 30, 32, . . . or in the partly-coating-portion forming region 53 in the above respective embodiments, operations and effects similar as the fifteenth embodiment can be obtained.

Although the invention has been described above with reference to certain embodiments of the invention, the invention is not limited to the embodiments described above. Modifications and variations of the embodiments described above will occur to those skilled in the art in light of the above teachings. For example, the above-mentioned materials (components) constituting each of the upper-layer coating composite 21 and the lower-layer coating composite 22 in the first embodiment can be changed to the other material(s).

Some technical structures obtainable from the above embodiments according to the present invention will now be listed with their advantageous effects.

[a] A piston for an internal combustion engine, comprising: a piston base material (1*a*) including a pair of skirt portions (8, 9) opposed to each other in a radial direction of the piston base material (1*a*); a multiple-layer coating (20) formed on at least one of surfaces of the pair of skirt portions (8, 9); and marks (30-37, 39, 40, 42-45, 47*a*-47*f*, 49*a*-49*d*, 51*a*-51*n*) provided to respective layers (21, 22, 46*a*-46*f*, 48*a*-48*d*, 50*a*-50*n*) of the multiple-layer coating (20) at locations different from each other.

[b] A piston for an internal combustion engine, comprising: a piston base material (1*a*) including a pair of skirt portions (8, 9) opposed to each other in a radial direction of the piston base material (1*a*); and a multiple-layer coating (20) formed on at least one of surfaces of the pair of skirt portions (8, 9), wherein an upper layer (21, 46*b*-46*f*) of the multiple-layer coating (20) is formed with a window portion (33, 35, 37, 40, 47*a*-47*f*), and a surface of the piston base material (1*a*) or a lower layer (22, 46*a*-46*e*) of the multiple-layer coating (20) is exposed through the window portion (33, 35, 37, 40, 47*a*-47*f*).

[c] A piston for an internal combustion engine, comprising: a piston base material (1*a*) including a pair of skirt portions (8, 9) opposed to each other in a radial direction of the piston base material (1*a*); a multiple-layer coating (20) formed on at least one of surfaces of the pair of skirt portions (8, 9), the multiple-layer coating (20) containing a solid lubricant; and single-layer mark coatings (42-43) provided at locations which are different from each other and which are away from the multiple-layer coating (20) through a non-coated portion (C) between the multiple-layer coating (20) and each of the single-layer mark coatings (42-43).

Accordingly, as an advantageous effect, for example, it can be determined whether or not the predetermined multiple-layer coating has been formed, by a visual check of the appearance of the piston by use of the marks (window portions).

[d] The piston as described in the above item [a], wherein the marks (34, 35, 42, 43, 47*a*-47*f*, 49*a*-49*d*, 51*a*-51*n*) corresponding to the respective layers (21, 22, 46*a*-46*f*, 48*a*-48*d*, 50*a*-50*n*) of the multiple-layer coating (20) are located at least on one circumferential side of the skirt portion (8, 9).

According to this structure, since the marks are provided at a skirt portion's part at which the skirt portion less-frequently or weakly slides in contact with the cylinder wall-surface, the marks are little influenced by friction so that the generation of abrasion can be suppressed. Moreover, the freedom degree of design of the skirt portion in the axial direction of piston is high.

[e] The piston as described in the above item [a], wherein each of the marks has the same composition as the corresponding layer of the multiple-layer coating (20), and the marks (44, 45) are located on an upper or lower side of the skirt portion (8, 9) relative to an axial direction of the piston.

According to this structure, since the marks are provided at a skirt portion's part at which the skirt portion less-frequently or weakly slides in contact with the cylinder wall-surface, the marks are little influenced by friction so that the generation of abrasion can be suppressed. Moreover, the freedom degree of design of the skirt portion in the axial direction of piston is high.

[f] The piston as described in the above item [a], wherein each of the marks has the same composition as the corresponding layer of the multiple-layer coating (20), and each of the marks (42-45, 49*a*-49*d*, 51*a*-51*n*) is formed to be continuous with the corresponding layer of the multiple-layer coating (20).

According to this structure, since the respective marks are continuous with the corresponding layers, the forming operation of the marks becomes easy. Moreover, the marks can be formed even if there is only a small space for forming the marks.

[g] The piston as described in the above item [a], wherein the multiple-layer coating (20) includes a lower-layer coating composite (22) coating a surface of the piston base material (1*a*) and an upper-layer coating composite (21) coating an upper surface of the lower-layer coating composite (22), each of the lower-layer coating composite (22) and the upper-layer coating composite (21) contains at least one of a polyamide-imide resin, a polyimide resin and an epoxy resin which are binding resins, the lower-layer coating composite (22) contains a solid lubricant including at least one of a graphite and a molybdenum disulfide, a content of the solid lubricant of the lower-layer coating composite (22) is lower than or equal to 50 wt % of the lower-layer coating composite (22), the upper-layer coating composite (21) contains a solid lubricant including one or both of the graphite and the molybdenum disulfide, and a content of the solid lubricant of the upper-layer coating composite (21) falls within a range from 50 to 95 wt % of the upper-layer coating composite (21).

According to this structure, a high adhesion property between the piston base material and the lower-layer coating composite is secured, and the upper-layer coating composite contains the solid lubricant including one or both of the graphite and the molybdenum disulfide. Moreover, the content of the solid lubricant of the upper-layer coating composite falls within a range from 50 to 95 wt % of the upper-layer coating composite. Therefore, the initial fitting property is superior when the outer circumferential surface of the piston slides on the cylinder wall-surface. That is, the surface of the upper-layer coating composite is abraded in a short time so that a smooth sliding surface of the piston is quickly formed. Hence, a superior initial fitting property can be obtained.

[h] The piston as described in the above item [b], wherein the lower layer (22, 46*a*-46*e*) of the multiple-layer coating (20) is exposed from an entire region of the window portion (33, 35, 37, 40, 47*a*-47*e*).

According to this structure, since the lower layer of the multiple-layer coating is exposed to the outside of piston from the entire window portion, the reduction of abrasion resistance due to friction can be inhibited when sliding in contact with the cylinder wall-surface.

[i] The piston as described in the above item [b], wherein the lower layer (22) of the multiple-layer coating (20) is exposed from one part of the window portion (37, 40), the surface of the piston base material (1*a*) is exposed from another part of the window portion (37, 40), and the another part of the window portion (37, 40) is located substantially at a circumferential center of the skirt portion (8, 9).

According to this structure, after the multiple-layer coating was applied, the radial size (diameter) between the both skirt portions can be measured by a micrometer or the like by using both the exposed surfaces of the piston base material.

[j] The piston as described in the above item [b], wherein one layer (46*f*) of the multiple-layer coating (20) includes at least the window portions (47*a*-47*e*) having a number obtained by subtracting 1 from a number of layers of the multiple-layer coating (20), and different layers of the multiple-layer coating (20) are exposed respectively from the window portions (47*a*-47*e*) of the one of the multiple-layer coating (20).

According to this structure, it can be judged whether or not the respective layers have been formed, by checking the corresponding window portions, even if the multiple-layer coating is constituted by two or more layers.

[k] The piston as described in the above item [j], wherein each layer of the multiple-layer coating (20) includes the window portions (47*a*-47*f*) having the number obtained by subtracting 1 from the number of layers of the multiple-layer coating (20), and each of a plurality of upper layers (46*b*-46*f*) of the multiple-layer coating (20) which are applied on an outer surface of a lowest layer (46*a*) of the multiple-layer coating (20) locates its window portions (47*a*-47*f*) so as to cover only one of the window portions (47*b*-47*f*) of the lowest layer (46*a*).

This application is based on prior Japanese Patent Applications No. 2010-145981 filed on Jun. 28, 2010 and No. 2011-63502 filed on Mar. 23, 2011. The entire contents of these Japanese Patent Applications are hereby incorporated by reference.

The scope of the invention is defined with reference to the following claims.

What is claimed is:

1. A piston for an internal combustion engine, comprising:

a piston base material including a pair of skirt portions opposed to each other in a radial direction of the piston base material;

a multiple-layer coating formed on at least one of surfaces of the pair of skirt portions; and marks provided to respective layers of the multiple-layer coating at locations different from each other, such that at least a part of each of the layers is directly applied to a surface of the piston base material.

2. The piston according to claim 1, wherein the multiple-layer coating includes a lower-layer coating formed directly on the piston base material and an upper-layer coating formed on the lower-layer coating, an adhesion property between the lower-layer coating and the piston base material is higher than an adhesion property between the upper-layer coating and the piston base material, an adhesion property between the upper-layer coating and the lower-layer coating is higher than the adhesion property between the lower-layer coating and the piston base material, and both of the lower-layer coating and the surface of the piston base material are exposed through the mark of the upper-layer coating.

3. The piston according to claim 1, wherein the multiple-layer coating includes a lower-layer coating formed on the surface of the piston base material and an upper-layer coating formed on the lower-layer coating, scattered coating portions each having the same composition as the lower-layer coating are formed on the surface of the piston base material, and the mark of the upper-layer coating is formed on the scattered coating portions.

4. The piston according to claim 3, wherein the scattered coating portions are a plurality of coating dot portions formed in the same shape as each other.

5. The piston according to claim 3, wherein a total area of the scattered coating portions which overlap with the mark of the upper-layer coating in a thickness direction of the multiple-layer coating is set within a range from 10% to 85% of an area of the mark of the upper-layer coating.

6. The piston according to claim 1, wherein the marks corresponding to the respective layers of the multiple-layer coating are located at least on one circumferential side of the skirt portion.

7. The piston according to claim 1, wherein each of the marks has the same composition as the corresponding layer of the multiple-layer coating, and the marks are located on an upper or lower side of the skirt portion relative to an axial direction of the piston.

8. The piston according to claim 1, wherein each of the marks has the same composition as the corresponding layer of the multiple-layer coating, and each of the marks is formed to be continuous with the corresponding layer of the multiple-layer coating.

9. The piston according to claim 1, wherein the multiple-layer coating includes a lower-layer coating composite coating the surface of the piston base material and an upper-layer coating composite coating an upper surface of the lower-layer coating composite, each of the lower-layer coating composite and the upper-layer coating composite contains at least one of a polyamide-imide resin, a polyimide resin and an epoxy resin which are binding resins, the lower-layer coating composite contains a solid lubricant including at least one of a graphite and a molybdenum disulfide, a content of the solid lubricant of the lower-layer coating composite is lower than or equal to 50 wt % of the lower-layer coating composite, the upper-layer coating composite contains a solid lubricant including one or both of the graphite and the molybdenum disulfide, and a content of the solid lubricant of the upper-layer coating composite falls within a range from 50 to 95 wt % of the upper-layer coating composite.

10. A piston for an internal combustion engine, comprising: a piston base material including a pair of skirt portions opposed to each other in a radial direction of the piston base material;

a multiple-layer coating formed on at least one of surfaces of the pair of skirt portions; and marks provided to respective layers of the multiple-layer coating at locations different from each other, wherein each of the marks is formed to protrude from a circumferential edge of a corresponding layer of the multiple-layer coating.

* * * * *